United States Patent
Peled et al.

(10) Patent No.: US 9,627,693 B2
(45) Date of Patent: *Apr. 18, 2017

(54) ENERGY STORAGE AND GENERATION SYSTEMS

(75) Inventors: Emanuel Peled, Even Yehuda (IL);
Arnon Blum, Mobile Post Shikmim (IL); Adi Aharon, Herzelia (IL); Nina Travitsky, Rehovot (IL); Yaron Konra, Ra'anana (IL); Ido Tsamir, Alon-Hagalil (IL); Vladimir Zel, Haifa (IL); Kobby Saadi, Givaatime (IL); Meital Alon, Tel Aviv (IL); Roy Gorenshtein, Bat-Yam (IL)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 957 days.

This patent is subject to a terminal disclaimer.

(21) Appl. No.: 13/574,877

(22) PCT Filed: Jan. 24, 2011

(86) PCT No.: PCT/IB2011/000099
§ 371 (c)(1),
(2), (4) Date: Jul. 24, 2012

(87) PCT Pub. No.: WO2011/089518
PCT Pub. Date: Jul. 28, 2011

(65) Prior Publication Data
US 2012/0299384 A1    Nov. 29, 2012

Related U.S. Application Data

(60) Provisional application No. 61/297,853, filed on Jan. 25, 2010.

(51) Int. Cl.
*H01M 4/96* (2006.01)
*H01M 8/0258* (2016.01)
(Continued)

(52) U.S. Cl.
CPC ........... *H01M 4/96* (2013.01); *H01M 4/9083* (2013.01); *H01M 4/921* (2013.01); *H01M 4/926* (2013.01);
(Continued)

(58) Field of Classification Search
CPC ......... H01M 8/04276; H01M 8/04283; H01M 8/04201; H01M 8/18–8/188
See application file for complete search history.

(56) References Cited

U.S. PATENT DOCUMENTS 3,152,013 A    10/1964  Juda
4,128,701 A  * 12/1978  Maricle .......................... 429/443
(Continued)

FOREIGN PATENT DOCUMENTS

CN    1321342 A    11/2001
DE    3522714 A1    1/1987
(Continued)

OTHER PUBLICATIONS

International Preliminary Report on Patentability, Chapter II, for PCT/IB2011/000099 (Parent Application) mailed Jan. 4, 2013.*
(Continued)

*Primary Examiner* — Rena D Cronin
(74) *Attorney, Agent, or Firm* — Ohlandt, Greeley, Ruggiero & Perle, L.L.P.

(57) ABSTRACT

This disclosure relates to energy storage and generation systems, e.g., combination of flow battery and hydrogen fuel cell, that exhibit operational stability in harsh environments, e.g., both charging and discharging reactions in a regenerative fuel cell in the presence of a halogen ion or a mixture of halogen ions. This disclosure also relates to energy storage and generation systems that are capable of conducting both hydrogen evolution reactions (HERs) and hydrogen oxidation reactions (HORs) in the same system. This dis-
(Continued)

closure further relates to energy storage and generation systems having low cost, fast response time, and acceptable life and performance.

19 Claims, 7 Drawing Sheets

(51) Int. Cl.
*H01M 4/90* (2006.01)
*H01M 4/92* (2006.01)
H01M 8/0271 (2016.01)
H01M 8/0202 (2016.01)
H01M 8/18 (2006.01)

(52) U.S. Cl.
CPC ........ *H01M 8/0202* (2013.01); *H01M 8/0258* (2013.01); *H01M 8/0271* (2013.01); *H01M 8/186* (2013.01); *Y02E 60/50* (2013.01); *Y02E 60/521* (2013.01); *Y02E 60/528* (2013.01); *Y02P 70/56* (2015.11); *Y10T 307/685* (2015.04)

(56) References Cited

U.S. PATENT DOCUMENTS

| | | | |
|---|---|---|---|
| 4,218,519 A | 8/1980 | Frank | |
| 4,312,927 A | 1/1982 | Salmon | |
| 5,599,638 A | 2/1997 | Surampudi et al. | |
| 5,916,505 A | 6/1999 | Cisar et al. | |
| 6,093,306 A | 7/2000 | Hanrahan et al. | |
| 6,447,943 B1 | 9/2002 | Peled et al. | |
| 6,492,047 B1 | 12/2002 | Peled et al. | |
| 6,811,911 B1* | 11/2004 | Peled et al. | 429/499 |
| 2003/0096145 A1 | 5/2003 | Sugawara et al. | |
| 2004/0126632 A1* | 7/2004 | Pearson et al. | 429/17 |
| 2008/0038567 A1* | 2/2008 | Way et al. | 428/457 |
| 2009/0028767 A1 | 1/2009 | Parker et al. | |
| 2010/0119937 A1* | 5/2010 | Winter | 429/185 |

FOREIGN PATENT DOCUMENTS

| | | |
|---|---|---|
| JP | 59-111272 | 6/1984 |
| JP | 59-196579 | 11/1984 |
| JP | 60-124367 | 7/1985 |
| JP | 62-005570 | 7/1985 |
| JP | 61-045569 | 3/1986 |
| JP | 63-313472 | 12/1988 |
| JP | 02250269 | 10/1990 |
| JP | 04-046535 | 2/1992 |
| JP | 04-124755 | 11/1992 |
| JP | 11016591 | 1/1999 |
| JP | 2003520412 A | 7/2003 |
| WO | WO 2004/109086 A2 | 12/2004 |

OTHER PUBLICATIONS

Third Office Action dated Jan. 9, 2015 for corresponding Chinese patent application No. 201180007112.4, pp. 15.
Notice of Preliminary Rejection dated Jan. 31, 2015 for corresponding Korean patent application No. KR520010296845, pp. 25.
Canadian Patent Office action dated Apr. 16, 2015 from corresponding Canadian Patent Application No. 2,787,477, pp. 6.
Office Action dated Mar. 31, 2015 for corresponding Japanese patent application No. JP2014-125289 with English translation, pp. 7.
Office Action dated Apr. 8, 2015 for corresponding Mexico patent application No. MX/a/2012/008654 with English translation, pp. 3.
Peled, et al., "Hydrogen-Bromine Fuel Cells", Encyclopedia of Electrochemical Power Sources, Nov. 23, 2009, pp. 182-191.
International Search Report and Written Opinion dated Oct. 13, 2011 for corresponding International Patent Application No. PCT/IB2011/000099.
Written Opinion of the International Preliminary Examining Authority dated Apr. 4, 2012 for corresponding International Patent Application No. PCT/IB2011/000099.
International Preliminary Report on Patentability dated May 16, 2012 for corresponding International Patent Application No. PCT/IB2011/000099.
Australian Office Action dated Jul. 3, 2013 from corresponding Australian Application No. 2011208460, 5 pages.
European Office Action dated Jul. 12, 2013 from corresponding European Application No. 11 714 386.7, 3 pages.
Mexican Office Action dated Mar. 26, 2014 corresponding to Mexican Patent App. MX/a/2012/008654, 4 pp.
Chinese Office Action dated Apr. 1, 2014 corresponding to Chinese App. No. 201180007112.4 with English translation,13 pp.
Office Action dated Sep. 23, 2014 for corresponding Mexico patent application No. MX/a/2012/008654 with English translation, pp. 4.
Australian Office Action dated Jun. 14, 2013 corresponding to Australian Patent Application 2011208458, 4 pp.
Japanese Office Action dated Feb. 25, 2014 corresponding to Japanese Patent App. No. JP2012-549436 with English translation, 4 pp.
Canadian Office Action dated Jul. 29, 2014 corresponding to Canadian Patent App. No. 2,787,477, 2 pp.
Office Action dated Feb. 5, 2016 for corresponding Chinese patent application No. 2014104058552, pp. 14.
Final Office Action dated Jan. 19, 2016 for corresponding Japanese design patent application No. JP2014-125289 with English translation, pp. 4.

\* cited by examiner

ENERGY STORAGE AND GENERATION SYSTEMS

RELATED APPLICATIONS

This application claims the benefit of U.S. Provisional Application Ser. No. 61/297,853, filed on Jan. 25, 2010, and PCT/IB2011/000099, filed Jan. 24, 2011, both of which are incorporated herein by reference in their entirety.

BACKGROUND

1. Field of the Disclosure

This disclosure relates to energy storage and generation systems, e.g., combination of flow battery and hydrogen fuel cell, that exhibit operational stability in harsh environments, e.g., both charging and discharging reactions in a regenerative fuel cell in the presence of a halogen ion or a mixture of halogen ions. This disclosure also relates to energy storage and generation systems that are capable of conducting both hydrogen evolution reactions (HERS) and hydrogen oxidation reactions (HORS) in, the same system. This disclosure further relates to energy storage and generation systems having low cost, fast response time, and acceptable life and performance

2. Discussion of the Background Art

There are several technologies for energy storage and generation. These technologies can be divided into three subgroups: mechanical including pumped hydro, compressed air, fly wheels, and the like; electrical including super capacitors, super conducting magnets, and the like; and electrochemical including batteries, flow batteries, hydrogen storage, and the like. The current technology of electrochemical storage and generation is either expensive or inefficient or both. Generally, batteries can store and supply power at high efficiency, but are limited in capacity (total energy). Also, flow batteries are limited in power density and response time.

Fuel cells are often described as continuously operating batteries or as electrochemical engines. A typical fuel cell consists of two electrodes, an anode and a cathode, and a membrane interposed between the anode and cathode. Fuel cells operate by converting fuel combustion energy, such as hydrogen, to electrical power through an electrochemical process. It does so by harnessing the electrons released from controlled oxidation-reduction (redox) reactions occurring at the surface of a catalyst dispersed on the electrodes.

Regenerative fuel cells typically operate in harsh environments that can have an adverse effect on catalyst activity in the fuel cell. An important issue connected to catalyst activity in regenerative fuel cells that utilize, for example, a halogen acid electrolyte, is poisoning of the hydrogen catalyst by the halides. The membrane cannot completely prevent electrolyte crossover from one side of the cell to the other. For example, in a hydrogen tri-bromide fuel cell (HTBFC), bromides, e.g., tri-bromide, diffuse to the hydrogen electrode and poison the catalyst. Despite the fact that hydrogen oxidation/evolution reaction is fast and its overpotential is rather low compared to other voltage losses in the regenerative cell, in halogen ion-containing solutions, the catalyst is severely poisoned, and this raises the overpotential of the hydrogen electrode in the regenerative fuel cell.

Acceptance of energy storage and generation technologies depends on their cycle life and performance capability. In particular, with regard to regenerative fuel cells, they can be run, in addition to the direct mode, in the reversible mode, consuming electricity and the products of the direct reaction in order to produce the reactants of the direct reaction. For regenerative fuel cell such as hydrogen/bromine fuel cells, an important factor limiting its cycle life and efficiency is the degradation of the operating fuel cell materials. These materials are exposed to a highly corrosive bromine electrolyte for long periods of time at elevated temperature.

Energy storage and generation devices are needed for wide application with regenerative energy sources. Such storage and generation devices are useful in matching a varying energy supply to a varying energy demand.

A need exists for energy storage and generation systems that exhibit operational stability in harsh environments, e.g., both charging and discharging reactions in a regenerative fuel cell in the presence of a halogen ion or a mixture of halogen ions. Also, a need exists for energy storage and generation systems that are capable of conducting both hydrogen evolution reactions (HERs) and hydrogen oxidation reactions (HORs) in the same system. It would be desirable in the art to provide energy storage and generation systems having low cost, e.g., low cost electrolytes, fast response time, and acceptable life and performance.

The present disclosure provides many advantages, which shall become apparent as described below.

SUMMARY

This disclosure generally relates to energy storage and generation systems, e.g., combination of flow battery and hydrogen fuel cell, that exhibit operational stability in harsh environments, e.g., both charging and discharging reactions in a regenerative fuel cell in the presence of a halogen ion or a mixture of halogen ions. This disclosure also relates to energy storage and generation systems that are capable of conducting both hydrogen evolution reactions (HERs) and hydrogen oxidation reactions (HORs) in the same system. This disclosure further relates to energy storage and generation systems having low cost, fast response time, and acceptable life and performance.

This disclosure relates in part to an energy storage and generation system comprising at least one vessel suitable for holding an electrolyte, at least one vessel suitable for holding a gas, and one or more stacks of regenerative fuel cells. The regenerative fuel cells comprise a housing; a solid electrolyte membrane having a first surface and a second surface, disposed in the housing to partition it into an anode side and a cathode side; an anode disposed on the first surface so as to connect the first surface to the anode side; and a cathode disposed on the second surface so as to connect the second surface to the cathode side. The anode comprises a support and a catalyst dispersed thereon. The cathode comprises a support and a catalyst optionally dispersed thereon. The catalyst dispersed on the anode support and the catalyst optionally dispersed on the cathode support are the same or different and are capable of catalyzing, in the presence of an electrolyte or mixture of electrolytes, e.g., a halogen ion or a mixture of halogen ions, a charging reaction and a discharging reaction in the regenerative fuel cells. The at least one vessel suitable for holding an electrolyte is in fluid communication with the one or more stacks of regenerative fuel cells, and the one or more stacks of regenerative fuel cells are in fluid communication with the at least one vessel suitable for holding an electrolyte, to form at least an electrolyte circulation loop. The at least one vessel suitable for holding a gas is in fluid communication with the one or more stacks of regenerative fuel cells, and the one or more stacks of regenerative fuel cells are in fluid communication with the at least one vessel suitable for holding a gas, to form at least a gas circulation loop.

This disclosure also relates in part to a energy storage and generation system comprising at least one vessel suitable for holding an electrolyte, at least one vessel suitable for holding a gas, and one or more stacks of regenerative fuel cells comprising a solution or electrolyte compartment, a gas compartment and a membrane electrode assembly (MEA) disposed between the solution or electrolyte compartment and the gas compartment. The membrane electrode assembly (MEA) comprises an anode, a cathode and a solid electrolyte membrane disposed between the anode and the cathode. The anode faces the gas compartment and the cathode faces the solution or electrolyte compartment. The anode comprises a support and a catalyst dispersed thereon. The cathode comprises a support and optionally a catalyst dispersed thereon. The catalyst dispersed on the anode support and the catalyst optionally dispersed on the cathode support are the same or different and are capable of catalyzing, in the presence of an electrolyte or mixture of electrolytes, e.g., a halogen ion or a mixture of halogen ions, a charging reaction and a discharging reaction in the regenerative fuel cell. The at least one vessel suitable for holding an electrolyte is in fluid communication with the one or more stacks of regenerative fuel cells, and the one or more stacks of regenerative fuel cells are in fluid communication with the at least one vessel suitable for holding an electrolyte, to form at least an electrolyte circulation loop. The at least one vessel suitable for holding a gas is in fluid communication with the one or more stacks of regenerative fuel cells, and the one or more stacks of regenerative fuel cells are in fluid communication with the at least one vessel suitable for holding a gas, to form at least a gas circulation loop.

This disclosure further relates in part to a energy storage and generation system comprising at least one vessel suitable for holding an electrolyte, at least one vessel suitable for holding a gas, and one or more stacks of regenerative fuel cells comprising an anode, a cathode and a solid electrolyte membrane disposed between the anode and the cathode. The anode comprises a support and a catalyst dispersed thereon. The cathode comprises a support and optionally a catalyst dispersed thereon. The catalyst dispersed on the anode support and the catalyst optionally dispersed on the cathode support are the same or different and are capable of catalyzing, in the presence of an electrolyte or mixture of electrolytes, e.g., a halogen ion or a mixture of halogen ions, a reaction between a fuel and an oxidant to generate an electric current. The at least one vessel suitable for holding an electrolyte is in fluid communication with the one or more stacks of regenerative fuel cells, and the one or more stacks of regenerative fuel cells are in fluid communication with the at least one vessel suitable for holding an electrolyte, to form at least an electrolyte circulation loop. The at least one vessel suitable for holding a gas is in fluid communication with the one or more stacks of regenerative fuel cells, and the one or more stacks of regenerative fuel cells are in fluid communication with the at least one vessel suitable for holding a gas, to form at least a gas circulation loop.

This disclosure yet further relates in part to a method of maintaining a different electrolyte and gas pressure within a fuel cell stack. The method comprises sensing the pressure of electrolyte and gas within the fuel cell stack; and controlling the pressure of electrolyte entering the fuel cell stack sufficient to maintain the electrolyte pressure different from the gas pressure within the fuel cell stack.

This disclosure also relates in part to a method for storing and generating energy. The method comprises providing an energy storage and generation system comprising at least one vessel suitable for holding an electrolyte; at least one vessel suitable for holding a gas; and one or more stacks of regenerative fuel cells. The regenerative fuel cells comprise a housing; a solid electrolyte membrane having a first surface and a second surface, disposed in the housing to partition it into an anode side and a cathode side; an anode disposed on the first surface so as to connect the first surface to the anode side; and a cathode disposed on the second surface so as to connect the second surface to the cathode side. The anode comprises a support and a catalyst dispersed thereon. The cathode comprises a support and a catalyst optionally dispersed thereon. The catalyst dispersed on the anode support and the catalyst optionally dispersed on the cathode support are the same or different and are capable of catalyzing, in the presence of an electrolyte or mixture of electrolytes, e.g., a halogen ion or a mixture of halogen ions, a charging reaction and a discharging reaction in the regenerative fuel cells. The at least one vessel suitable for holding an electrolyte is in fluid communication with the one or more stacks of regenerative fuel cells, and the one or more stacks of regenerative fuel cells are in fluid communication with the at least one vessel suitable for holding an electrolyte, to form at least an electrolyte circulation loop. The at least one vessel suitable for holding a gas is in fluid communication with the one or more stacks of regenerative fuel cells, and the one or more stacks of regenerative fuel cells are in fluid communication with the at least one vessel suitable for holding a gas, to form at least a gas circulation loop.

The method comprises storing energy by flowing electrolyte from the at least one vessel suitable for holding an electrolyte to the one or more stacks of regenerative fuel cells, oxidizing the electrolyte and producing hydrogen in the one or more stacks of regenerative fuel cells, and flowing the hydrogen to the at least one vessel suitable for holding a gas. The method comprises generating energy by flowing electrolyte from the at least one vessel suitable for holding an electrolyte to the one or more stacks of regenerative fuel cells, flowing hydrogen from the at least one vessel suitable for holding a gas to the one or more stacks of regenerative fuel cells, reducing the electrolyte and oxidizing the hydrogen in the one or more stacks of regenerative fuel cells.

Further objects, features and advantages of the present disclosure will be understood by reference to the following drawings and detailed description

DETAILED DESCRIPTION OF THE PREFERRED EMBODIMENT

This disclosure relates to energy storage and generation systems, e.g., a combination of flow battery and hydrogen fuel cell, that utilize the same cell for both energy storage and energy generation. The energy storage and generation systems can achieve high power for fuel cell technology—up to 1.5 W/cm² (at 80° C.), while achieving low cost storage price due to the implementation of low cost electrolytes. The energy storage and generation systems of this disclosure also exhibit fast response time.

The energy storage and generation systems of this disclosure include an electrolyte circulation loop which comprises one or more valves, one or more pumps, and optionally a pressure equalizing line. The energy storage and generation systems of this disclosure also include a gas circulation loop which comprises one or more valves, one or more pumps, a gas purifier, a liquid absorber, a gas circulation ejector, and optionally a gas compressor.

The energy storage and generation systems of this disclosure can include a management system. The management system may be any suitable controller device, such as a computer or microprocessor, and preferably contains logic circuitry which decides how to operate the various valves, pumps, circulation loops, and the like.

Figure 1:
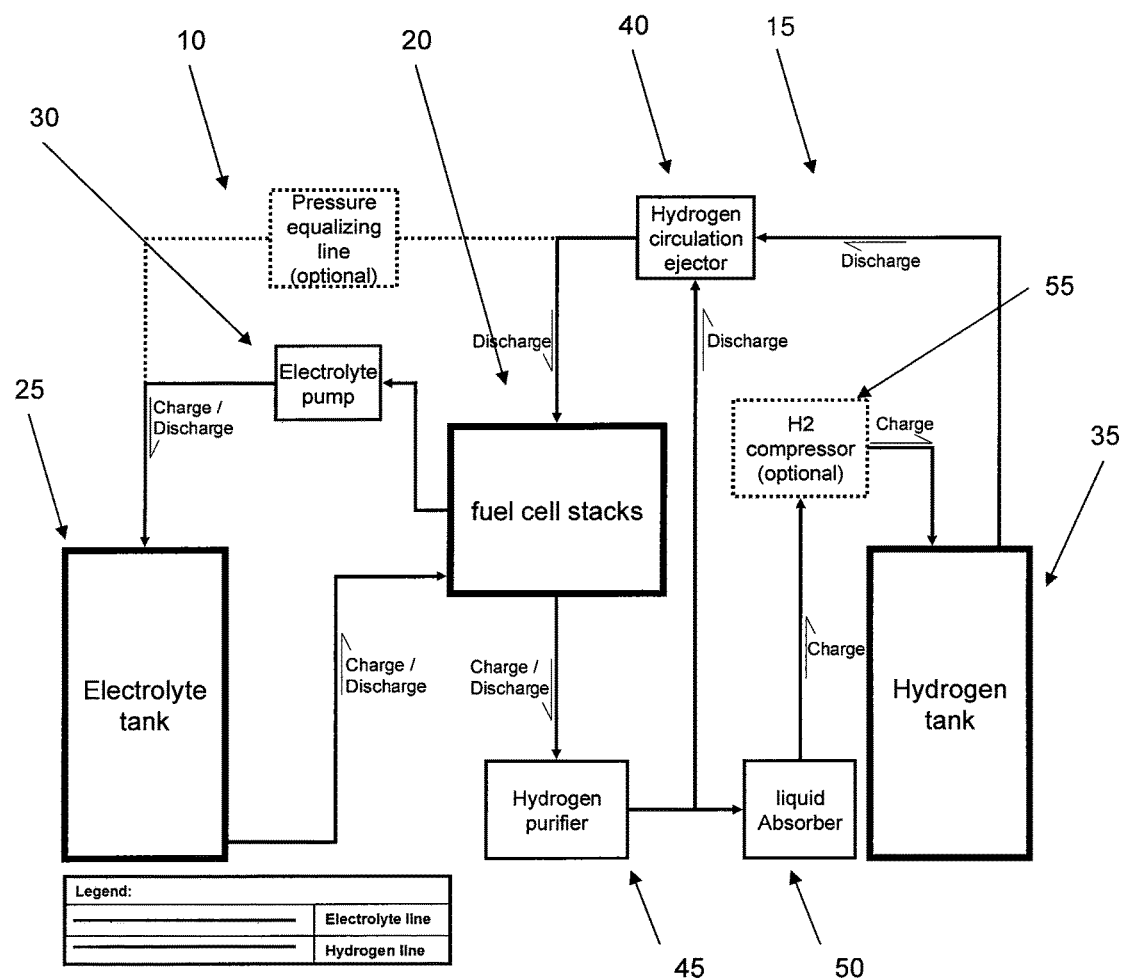
FIG. 1 is a block diagram of an energy storage and generation system of this disclosure.

FIG. 1 illustrates a process block diagram of the energy storage and generation system of this disclosure. The system is divided into two sides, i.e., an electrolyte side 10 and a gas, i.e., hydrogen, side 15. The fuel cell stacks 20 are located between the reactants. The electrolyte side 10 consists of electrolyte tank 25 and an electrolyte circulation pump 30. The pump 30 circulates the liquid electrolyte through the fuel cell stack 20 during energy storage stage and during energy generation stage. The hydrogen side 15 consists of a hydrogen tank 35, hydrogen circulation ejector 40, hydrogen purifier 45 for treatment of hydrogen exiting the fuel cell stack 20, liquid absorber 50 for separation of draft droplets from the hydrogen leaving the fuel cell stack 20, and an optional hydrogen compressor 55 for compressing hydrogen into the tank 35.

The general operation principle of the regenerative fuel cell system can be described with respect to the energy storage stage (both electrolyte line and hydrogen line) and energy generation stage (both electrolyte line and hydrogen line).

With regard to the electrolyte line of the energy storage stage, electrolyte flows from the electrolyte tank 25 into the fuel cell stacks 20 and is oxidized. Electrolyte from the fuel cell stacks 20 is taken up by the electrolyte pump 30 and pumped back into the electrolyte tank 25.

With regard to the hydrogen line of the energy storage stage, hydrogen is produced in the fuel cell stacks 20 and thereafter flows into the hydrogen purifier 45. Traces of liquid inside the hydrogen stream are absorbed in the liquid absorber 50. The hydrogen is then optionally compressed by a compressor 55 to facilitate compressing of hydrogen into tank 35.

With regard to the electrolyte line of the energy generation stage, electrolyte flows from the electrolyte tank 25 into the fuel cell stacks 20 and is reduced. Electrolyte from the fuel cell stacks 20 is taken up by the electrolyte pump 30 and pumped back into the electrolyte tank 25.

With regard to the hydrogen line of the energy generation stage, hydrogen from the tank 35 flows through the hydrogen circulation ejector 40 and then to the fuel cell stacks 20. Hydrogen is oxidized inside of the fuel cell stacks 20. Any excess hydrogen (not reacted) exits the fuel cell stacks 20 and flows to the hydrogen purifier 45. Traces of liquid inside the hydrogen stream are absorbed in the liquid absorber 50. The hydrogen is then optionally compressed by a compressor 55 to facilitate compressing of hydrogen into tank 35.

The electrolytes useful in the energy storage and generation systems of this disclosure comprise a halogen acid, a mixture of halogen acids, an iron salt and conjugated acid thereof, or a mixture of iron salts and conjugated acids thereof. The gas useful in the energy storage and generation systems of this disclosure comprises hydrogen.

In halogen—hydrogen regenerative fuel cells, the electrolyte consists of a halogen acid or a mixture of halogen acids. On charging (electrolysis mode) the halogen molecule, tri-atom and penta-atom complex ions form (depending on the type of the acid used and its concentration) at the halogen positive electrode.

For example, when a high concentration of HBr is used, the oxidation products are: $Br^-$ as the major product, a small concentration of $Br^{5-}$ ions, and a small concentration of dissolved bromine molecules. When using mixture of halogen acids, a mixture of complexes can be formed such as for example: $ClBr_2^-$, $Br_2I^-$ and $IBr_2^-$.

These ions and the dissolved halogen molecule are the oxidation compounds that, on discharge accept electrons from the positive electrode and turn back into the halogen acid (HX). The particular halogen acid to be used in the energy storage and generation systems of this disclosure depends on the end-use application. For example, HCl has a high vapor pressure in comparison to HBr and HI, but the hydrogen chlorine cell has higher voltage. A passive acid (i.e., a acid that does not take part in the cell reactions) such as phosphoric acid can be added to increase electrolyte viscosity. This reduces halide complex ions crossing over to the hydrogen electrode with minor effect on proton conductivity. Other passive acids include sulfuric acid or trifluoromethanesulfuric acid that can be added to increase electrolyte conductivity.

For example, in a hydrogen—tribromide regenerative fuel cell, the hydrogen-tribromide fuel cells and electrolyzers consist of a bromine electrode and a hydrogen electrode with a proton-conducting membrane between them. All cell components, especially the electrodes, must be capable of resisting corrosion by bromine and hydrobromic acid.

The hydrogen—tribromide regenerative fuel cell reaction (discharge) is given by equation 1:

$$H_2 + Br_2 \leftrightarrow 2HBr \qquad [1]$$

From the reversible cell voltage given by the Nernst equation as shown in equation 2, it can be seen that the hydrogen-bromine cell voltage decreases with increasing HBr activity, and increases with $H_2$ pressure and $Br_2$ activity.

$$E = E_0 + \frac{RT}{2F}\ln a_{Br_2} + \frac{RT}{2F}\ln P_{H_2} - \frac{RT}{F}\ln a_{H^-} - a_{Br^-} \qquad [2]$$

where $E_o$ is, in fact, the standard potential of the $Br_2/Br^-$ electrode (1.088V vs. normal hydrogen electrode (NHE)).

The formation of bromine complexes reduces $E_o$ by less than 0.1 V. The experimental output circuit voltage (OCV) values at room temperature for a fully-charged regenerative hydrogen-bromine fuel cell based on nano-porous proton conducting membrane (NP-PCM) containing 3-7M HBr are about 1V.

Bromine is highly soluble in aqueous electrolytes. The solubility of bromine in water increases in the presence of bromides as a result of the formation of complex ions like $Br_3^-$ and $Br_5^-$. For example, the solubility of bromine in 1M HBr at 25° C. is 1.495 mole/liter, while in 3.1M NaBr it is 6.83M (partly due to the formation of higher complexes like $Br_5^-$). The color of the solution is yellow at low bromine (or tribromide) concentration and deep red at high bromine (or tribromide) concentrations. The molar absorptivity of bromine gas at 405 nm is 162 and that for aqueous bromine solution at 393 nm is 164.

The formation of tribromide ion in the presence of bromine and bromide is a fast reaction given by equation 3:

$$Br_2 + Br^- \underset{K_b}{\overset{K_f}{\rightleftarrows}} Br_3^- \quad [3]$$

The equilibrium constant for this reaction at 25° C. is 17. As a result, in practical fuel cells and electrolyzers containing 3 to 7M HBr, most of the bromine is present as tribromide ions (and some as pentabromide ions) and the concentration of free bromine is low. For example, at 25° C. in a solution of 3M HBr and 1M $Br_2$, the concentrations of $Br_3^-$ and $Br_2$ (ignoring the formation of pentabromide ions which further reduces the bromine concentration) are 0.97 M and 0.03 M respectively.

In the hydrogen-bromine fuel cell, there are two major parallel reactions at the bromine electrode (equations 4 and 5):

$$Br_3^- + 2e^- \underset{oxidation}{\overset{reduction}{\rightleftarrows}} 3Br^- \quad [4]$$

$$Br_2 + 2e^- \underset{oxidation}{\overset{reduction}{\rightleftarrows}} 2Br^- \quad [5]$$

Since, in practical fuel cells with high HBr concentration, the concentration of free bromine is much smaller than that of the tribromide ion, it is expected that the reaction in equation 4 prevails. In this (and similar) regenerative fuel cells, the oxidizing species such as $Br_3^-$ and $Br_2$ crossover to the hydrogen electrode and reduce regenerative fuel cell performance. This can be reduced by using a selective membrane such as nanoporous proton conducting membrane which reduces this crossover significantly. In order to reduce the bromine ($Br_2$) concentration, or to increase its molecular size, organic compounds such as N-ethylpyrrolidinium bromide, N-methylpyrrolidinium bromide, N-chloroethylpyrrolidinium bromide, N-chloromethylpyrrolidinium bromide, and others can be used at low concentrations to complex. However, it is necessary to pick organic compounds that do not interfere with the hydrogen electrode. Also, the additives concentration should be low enough to avoid phase separation.

In iron—hydrogen regenerative fuel cells, the electrolyte consists of an iron salt and the conjugated acid or a mixture of different iron salts their conjugated acids to achieve multiple iron ligands. The charge transfer process in Fe(III)/Fe(II) redox couple is an inner sphere process, therefore the charge transfer kinetics is highly dependent on the nature of the iron complex and its electrochemical characteristics. In the presence of different ligands, Fe(III) and Fe(II) ions can take a form of free ions or complexes in the solution, hence presenting a challenge in choosing the optimal electrolyte composition and the optimal operation conditions for each composition. The cell reaction is given in equation 6a for a monoprotic acid and equation 6b for diprotic acid.

$$H_2 + FeX_3 \leftrightarrow FeX_2 + HX \quad [6a]$$

$$H_2 + Fe_2(X)_3 \leftrightarrow FeX + H_2X \quad [6b]$$

Illustrative iron salts and conjugated acids useful in the energy storage and generation systems of this disclosure include:

| Iron salt | Conjugated acid |
|---|---|
| $Fe_2(SO_4)_3$ | $H_2SO_4$ |
| $FeCl_3$ | HCl |
| $FeBr_3$ | HBr |
| $FeI_3$ | HI |
| $Fe(CF_3SO_3)_3$ | $CF_3SO_3H$ (triflic acid) |
| $Fe(ClO_4)_3$ | $HClO_4$ |

Different ligands, acids and concentrations may affect regenerative fuel cell characteristics and will afford solutions to different applications. For example, the use of $Fe_2(SO_4)_3$ and $H_2SO_4$ may result in higher operation potential and the use of $FeCl_3$ HCL may enable working in higher concentrations.

When dealing with conductive electrolytes and fuel cell stacks that are connected electrically in series directly to each other, shunt currents can be develop between stacks. Like the shunt currents found within fuel cell stacks, those currents will cause chemical reactions that will reduce the efficiencies of the energy storage and generation system.

When connecting fuel cell stacks electrically in series, the shunt currents can develop on the inlet and outlet manifold that supply the conductive electrolyte to the fuel cell stacks. As more fuel cell stacks are connected in series, the voltage potential developed within the main inlet and outlet feed tubing gets higher. Shunt currents can be reduced in two different ways, namely mechanically or electronically.

The one or more stacks of regenerative fuel cells useful in the energy storage and generation systems of this disclosure comprise (i) an electrolyte feed inlet opening and an electrolyte feed line extending from the electrolyte feed inlet opening exteriorly from the one or more stacks of regenerative fuel cells, the electrolyte feed line in fluid communication with the at least one vessel suitable for holding an electrolyte, for delivery of electrolyte into the one or more stacks of regenerative fuel cells; and (ii) an electrolyte discharge outlet opening and an electrolyte discharge line extending from the electrolyte discharge outlet opening exteriorly from the one or more stacks of regenerative fuel cells, the electrolyte discharge line in fluid communication with the at least one vessel suitable for holding an electrolyte, for removal of electrolyte from the one or more stacks of regenerative fuel cells.

At least a portion of the electrolyte feed line adjacent to the electrolyte feed inlet opening has a coiled configuration, and at least a portion of the electrolyte discharge line adjacent to the electrolyte discharge inlet opening has a coiled configuration. The diameter and length of at least a portion of the electrolyte feed line adjacent to the electrolyte feed inlet opening having a coiled configuration, and the diameter and length of at least a portion of the electrolyte discharge line adjacent to the electrolyte discharge inlet opening having a coiled configuration, can the same or different.

Figure 2:
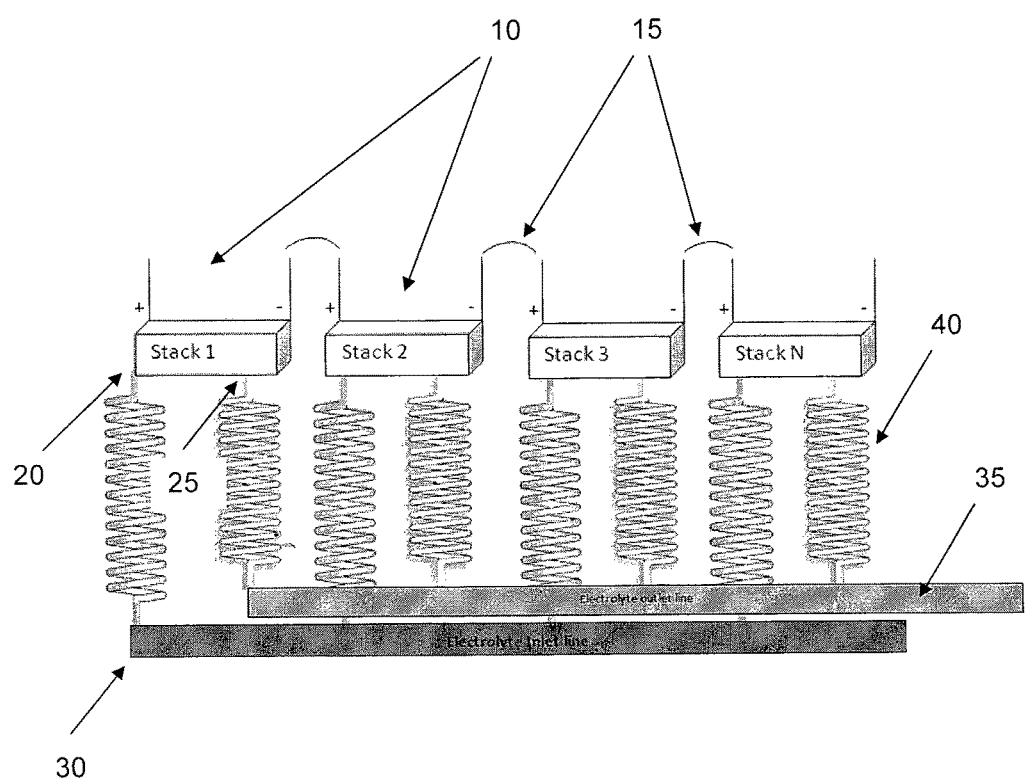
FIG. 2 is a schematic representation of a mechanically connected fuel cell stack in series.

The stacks of regenerative fuel cells useful in the energy storage and generation systems of this disclosure can be connected mechanically in series. FIG. 2 illustrates a mechanically connected fuel cell stack in series. FIG. 2 shows four fuel cell stacks 10 which are electrically connected in series 15. Instead of connecting the inlet 20 and outlet 25 of each fuel cell stack directly to the main feed (electrolyte inlet line) 30 and drain (electrolyte outlet line) 35 piping, long low diameter tubing is added 40. The tubing 40 is preferably in coiled configuration. This tubing 40 adds ionic resistor in series to the fuel cell stack 10 and helps to increase the net ohmic resistance of the ionic solution, thereby reducing losses due to shunt currents. The channels going between each fuel cell stack 10 and the inlet line 30 are drawn longer than that going from the same fuel cell stack 10 to the output line 35, but this is not necessarily so in practice and in many embodiments they are of the same length for a given fuel cell stack 10. A simplified estimate of the diameter and length of the tubing 40 can be described in the following way, and the parameters of the tubing should fit the equation below.

V (volts)—the total voltage in the array of stacks connected in series.
I (Amp)—the operating current of each stack.
L (%)—approved percentage of shunt current losses in the system.
IL (Amp)—current losses by shunt=I*L.
R (Ohm)—tubing ionic resistance=V/IL
S (Ohm/cm3)—solution resistance
D (cm)—tubing diameter.
X (cm)—tubing length $$R=3.14*(D/2)^2*X*S.$$

The length of the inlet and outlet tubing of each fuel cell stack in the array does not have to be the same all across the array. A differential approach can also be used, for example, where the stack in the middle of the array has the shortest inlet and outlet tubing, while moving to the sides of the array the length of tubing for each fuel cell stack is increased.

An example of tubing calculation for mechanically connection of three fuel cell stacks in series is given below.

| Total voltage of 3 stacks array, V | 450 |
| Current, A | 120 |
| Approved shunt current losses, % | 1 |
| Current losses by shunt current, A | 1.2 |
| Tubing Ionic resistance, Ohm | 375 |
| Solution resistance, Ohm/cm$^3$ | 0.05 |
| Tubing diameter, cm | 5 |
| Tubing length, m | 3.8 |

For a reference case, using the same equation above, but taking connection tubing with only 1 m length, will result in increase current losses by shunt to 4.6 Ampere, which is almost 4% of the total current.

The use of electronics in order to eliminate shunt current over mechanical tubing can reduce the complexity of system tubing, make the system more compact, and allow to form any combination of fuel cell stacks in order to achieve the optimal output voltage.

The stacks of regenerative fuel cells useful in the energy storage and generation systems of this disclosure can be connected electronically in series. The stacks of regenerative fuel cells that are connected electronically in series can be connected by an electronic appliance having an input that is not electrically connected to its output. The electronic appliance can include, for example, a DC/DC converter or a DC/AC converter.

Figure 3:
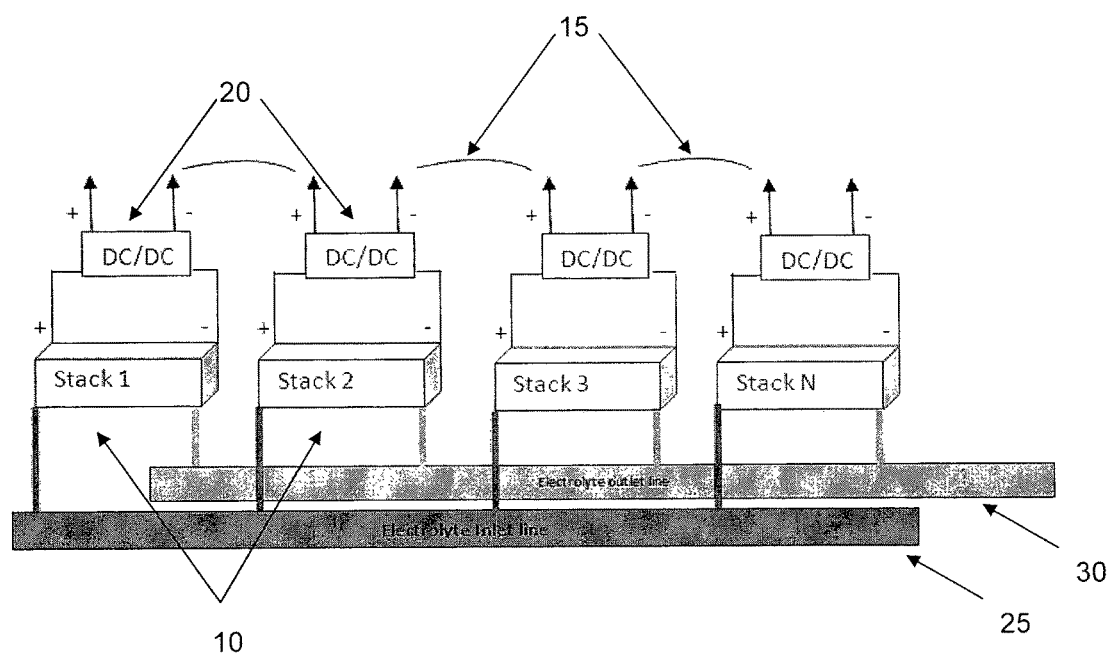
FIG. 3 is a schematic representation of an electrically connected fuel cell stack in series.

FIG. 3 illustrates an electronically connection of fuel cell stacks in series. FIG. 3 schematically shows a number of fuel cell stacks 10, where shunt currents are electronically reduced. The reduction is achieved by connecting the fuel cell stacks 10 to each other 15 via an electronic appliance having an input that is not electrically connected to its output (common ground), for example, a DC/DC converter 20. Each fuel cell stack is connected directly to the main feed (electrolyte inlet line) 25 and drain (electrolyte outlet line) 30.

In DC/DC or DC/AC converters, for example, the current conversion is achieved by inductive circuits, without electrical connection between the input and the output (mainly the ground). Each fuel cell stack is connected directly to DC/DC or DC/AC or any other electronic components where the input and output are not electrically connected. The output of each electronic device is connected in series to achieve high voltage output from the array. By eliminating physical electric connection between the fuel cell stacks prior to the electrical insulation device, no shunt currents will develop on the main inlet 25 and outlet 30 feed tubing.

Figure 4:
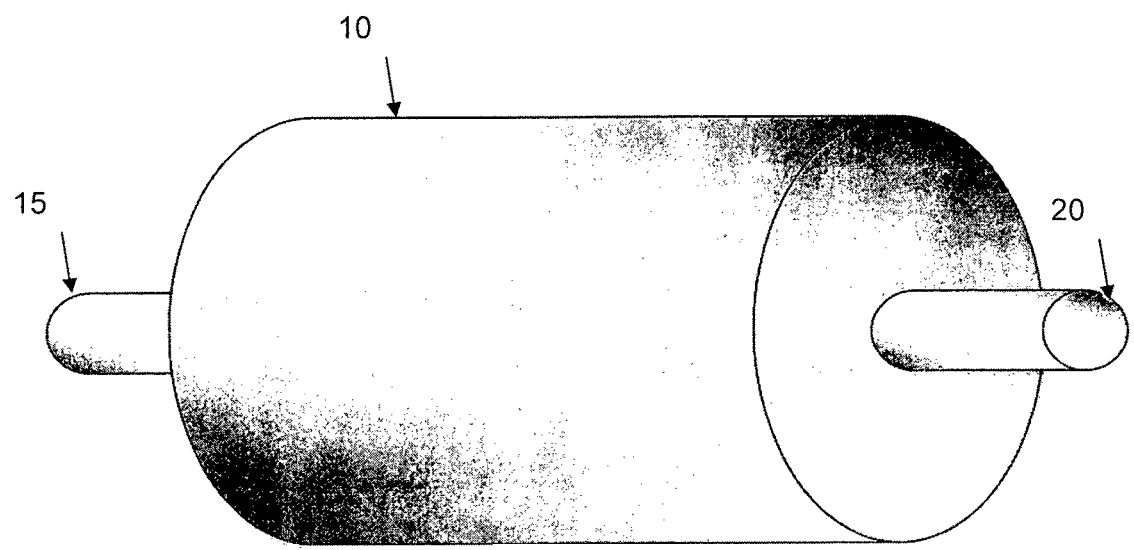
FIG. 4 depicts a hydrogen purifier.

The energy storage and generation systems of this disclosure can comprise a gas purifier containing a catalyst sufficient to reduce or eliminate corrosive elements from the gas. FIG. 4 illustrates a hydrogen purifier system. The gas exiting the fuel cell during hydrogen production stage (energy storage step), and excess hydrogen not consumed during discharge stage (energy generation step), may contain corrosive elements derived from the liquid electrolyte. These elements, such as wet halogen vapor, are corrosive and should be left out of the general gas stream for safer storage and easier material selection.

In order to eliminate corrosive halogen vapors from the general gas stream, oxidation of the halogen with hydrogen over catalytic matrix occurs. As shown in FIG. 4, the catalytic matrix is placed inside reactive vessel 10 which is located on the hydrogen exhaust stream of the fuel cell. Hydrogen with corrosive residuals enter the reaction vessel inlet 15 and leave through the vessel outlet 20 after the reaction of the corrosive elements has taken place.

The catalyst placed inside reaction vessel 10 is comprised of non-active catalytic beads and active catalytic particles. The non-active catalytic heads are made of any porous material like silica ($SiO_2$), carbon particles or alumina ($Al_2O_3$). The surface area of the supported beads can vary from about 0.1-350 m$^2$/g, preferably from about 0.1-100 m$^2$/g, and more preferably from about 0.1-1 m$^2$/g. The catalyst particle size is determined by the desired pressure loss across the reactor. The active catalyst can be embedded on the non-active beads by conventional methods, e.g., chemical or physical. The loading of the active catalyst on the non-active porous beads can range from about 0.01-5 wt %, preferably from about 0.1-1 wt %, and more preferably from about 0.4-0.6 wt %. The non-active beads can be treated with hydrophobic material, e.g., polytetrafluoroethylene (PTFE) or polyvinylidene fluoride (PVDF), to enhance its performance, and increase its durability. The hydrophobic load can vary from about 1-30 wt %, preferably from about 10-25 wt %, and more preferably from about 18-20 wt %.

In an embodiment, the electrolyte and gas are maintained at a different pressure inside the one or more fuel cell stacks used in the energy storage and generation systems of this disclosure. The electrolyte pressure is preferably maintained lower than the gas pressure within the fuel cell stack. In particular, a pressure differential controller in fluid communication with a pressure reducing valve can be used for controlling the pressure of electrolyte entering the fuel cell stack sufficient to maintain the electrolyte pressure different from the gas pressure within the fuel cell stack.

Figure 7:
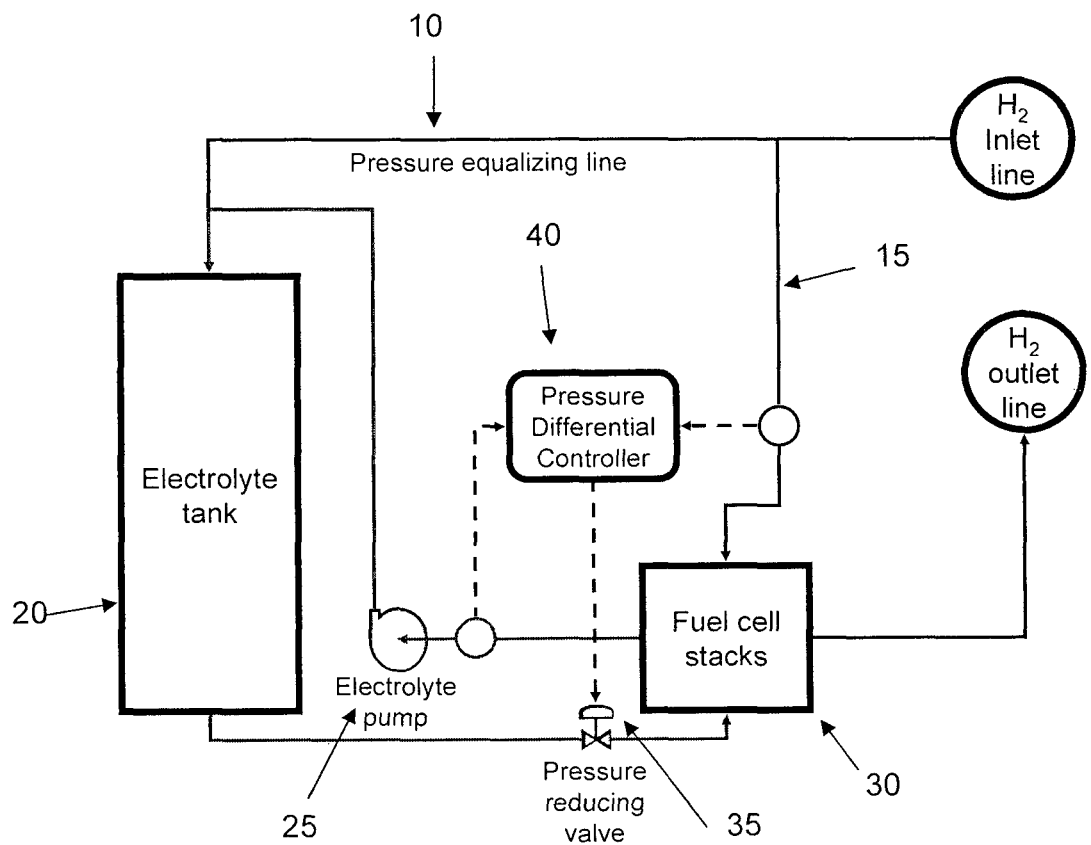
FIG. 7 is a block diagram of an energy storage and generation system of this disclosure for maintaining a pressure difference between the hydrogen and the electrolyte inside the fuel cell stack.

FIG. 7 illustrates a method for maintaining a pressure difference between hydrogen and the electrolyte inside the fuel cell stack. In an embodiment of this disclosure, it is desirable to keep the electrolyte pressure lower than the hydrogen pressure inside the fuel cell stack. Maintaining higher pressure on the hydrogen than on the electrolyte can have several advantages. The advantages can be thermodynamic, kinetic, durability and safety. For example, with regard to Thermodynamic, a potentially higher discharge voltage may be achieved. With regard to kinetic, better mass transport and activation energy can be achieved when the hydrogen side of the fuel cell is over pressured relative to the solution side. With regard to durability, higher hydrogen pressure keeps the hydrogen electrode hydrophobic properties for longer time and also helps to eliminate water droplets from the hydrogen side of the fuel cell. With regard to safety, the higher hydrogen pressure in the fuel cell keeps the electrolyte from crossing over into the hydrogen side of the fuel cell in case of membrane rupture or other leakage.

A method was developed to keep the gas pressure above the electrolyte pressure at all times, regardless of the gas pressure. Referring to FIG. 7, a pressure equalizing line 10 is used to level the pressure of the hydrogen gas inlet line 15 and the pressure on the top of the electrolyte tank 20. The hydrogen gas on top of electrolyte tank 20 creates a buffer layer that limit the diffusion of electrolyte vapors into the hydrogen side of the fuel cell. While the electrolyte pump 25 circulates the solution through the fuel cell stacks 30 and back to electrolyte tank 20, a pressure reducing valve 35 at the inlet of the fuel cell stacks 30 reduces the pressure of the solution. The exact pressure drop created by the pressure reducing valve 35 is determined by a pressure differential controller 40, which senses the pressure difference between the gas and the liquid, and sets the pressure reducing valve 35 to the desired value. The pressure difference can be changed via the pressure differential controller 40.

This disclosure provides catalyst compositions that include at least one precious metal. The catalyst compositions are capable of catalyzing a charging reaction and a discharging reaction in a regenerative fuel cell, e.g., a hydrogen/bromine regenerative fuel cell. The catalyst compositions are also capable of catalyzing hydrogen redox reactions and halogen/halide redox reactions. Further, the catalyst compositions are capable of catalyzing hydrogen evolution reactions (HERs) and hydrogen oxidation reactions (HORs). Particularly, the catalyst compositions are capable of catalyzing HERs and HORs in harsh environments, e.g., in the presence of a halogen ion or a mixture of halogen ions.

With regard to the fuel cell stacks, the catalyst compositions useful in this disclosure can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst compositions include PtRe, PdRe, Par, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst compositions useful in this disclosure include those where the at least one precious metal is supported on carbon powder or ceramic powder.

The catalyst compositions useful in this disclosure include precious metals, precious metal alloys (e.g., precious metals alloyed with other precious metals, transition metals and/or other elements), or precious metal mixtures (e.g., precious metals mixed with other precious metals, transition metals and/or other elements). The catalysts can be of a core-shell structure or a skin-type structure as described herein. The catalysts have been found to be more active towards HOR and HER reactions and more stable in tri-bromide solutions than state-of-the art Pt catalysts. The catalysts can be used for HOR in proton exchange membrane fuel cells (PEMFCs).

The catalyst compositions can be made by conventional procedures known in the art. The catalysts can be synthesized and characterized by conventional physical characterization methods and their activity can be tested electrochemically. The catalysts can be supported on carbon or ceramic powder. The catalyst compositions can be synthesized, for example, by electroless deposition or by polyol method. The catalyst compositions useful in this disclosure having a core-shell structure (or a skin structure) can be prepared by conventional procedures known in the art such as shown in the Examples below.

The unsupported catalysts useful in this disclosure have grain sizes typically in the range of from about 2 to about 8 nm, excluding Pd containing catalysts which grain size is in the range of from about 26 to about 53 nm. The supported catalysts useful in this disclosure have grain sizes typically in the range of from about 2 to about 7 nm. Most of the Pt and Ir containing catalysts comprise a skin-type structure, having an outer-shell rich in platinum, iridium and their alloys. In an embodiment, this disclosure includes skin-type catalysts. Skin-type catalysts were found to be highly active and stable in HER and HOR reactions in HTBFCs, tested in-situ and ex-situ. The durability of the catalysts useful in this disclosure, including sub monolayer ones, atom islands, and one or more monolayers of Pt and Ir and their alloys, with or without other elements, were found to be very good. Many thousands of charge—discharge (HOR/HER) cycles were achieved utilizing the catalysts of this disclosure in a hydrogen/bromine regenerative fuel cell.

In particular, for the catalyst compositions useful in this disclosure comprising a core-shell structure (or a skin structure), the core (or particle) preferably contains a low concentration of Pt or a Pt alloy. The Pt alloy can include one or more other precious metals, e.g., Ru, Re, Pd and Ir, and optionally one or more transition metals, e.g., Mo, Co and Cr. The core may also comprise a Pt-free metal or alloy. The Pt-free metal can include one or more precious metals, e.g., Ru, Re, Pd and Ir. The Pt-free alloy can include two or more precious metals, e.g., Ru, Re, Pd and Ir, and optionally one or more transition metals, e.g., Mo, Co and Cr. The shell (or skin) preferably comprises a sub-monolayer, or atom islands, to one or more layers of a precious metal, e.g., Pt or Ir, and alloys thereof. The Pt and Ir alloys can include one or more other precious metals, e.g., Ru, Re, and Pd, and optionally one or more transition metals, e.g., Mo, Co and Cr. The one or more other precious metals, e.g., Ru, Re, and Pd, are preferably present in the Pt and Ir alloys in a minor amount. Likewise, the one or more transition metals, e.g., Mo, Co and Cr, are preferably present in the Pt and Ir alloys in a minor amount. The catalyst compositions useful in this disclosure are capable of catalyzing, in the presence of a halogen ion or a mixture of halogen ions, a charging reaction and a discharging reaction in a regenerative fuel cell.

Carbon powder can also be a suitable catalyst for use in this disclosure. For bromide/tribromine redox reaction in the solution electrode, it has been found that carbon powder itself is an effective catalyst for the processes, reduction and oxidation. In another embodiment, the solution electrode may be used without any metallic catalyst.

This disclosure provides electrodes that are useful in the operation of fuel cells. The electrodes useful in this disclosure include anodes and cathodes that each include a support and a catalyst dispersed thereon. The electrodes can be made by processes described herein or by conventional procedures known in the art.

The catalysts dispersed on the electrodes are commonly nano particles (preferably 2-5 nm) of Pt, Ir, Pt alloys, and Ir with or without other elements. However, in order to save the cost of expensive noble metals, it is possible to use non-noble metal based alloys such as for example Ni, Fe, Co, Ir, or Ru as the core and coat them with the required noble metal catalyst by common electrochemical or chemical processes. The thickness of such catalyst layer may be between less than one monolayer to 10 monolayers.

Electrodes according to this disclosure are porous, and are made by processes designed to control their porosity and hydrophobicity. For example, the electrodes can be fabricated by coating a carbon support (for example, a commercially available carbon cloth or paper) with a suspension comprising carbon powder, a polymeric binder, and in some cases a pore-former. The suspension can optionally comprise powder of metallic catalyst. For solution electrodes, a metallic catalyst is optional, whereas for hydrogen electrodes, a metallic catalyst is required. The suspension (with or without catalyst) is referred herein as "ink". The suspension is mixed for several hours, applied to the carbon support, solidified, optionally by drying and heating, and then washed, for example, with solvents and/or water to remove the pore former, leaving pores behind. The resulting layer is called a microporous layer or a diffused layer and, in the gas side, it is called a gas diffused layer (GDL). Electrodes used with rechargeable fuel cells in accordance with this disclosure have a porosity of between about 30% and about 80% (vol/vol). Preferably, a porosity of between about 40% and about 80% (vol/vol) provides convenient and efficient electrodes.

In an embodiment, the fuel cell uses the same electrodes for charging and for discharging modes. In such an embodiment, the fuel cell typically has a solution compartment, a hydrogen compartment, and a membrane electrode assembly connecting between them. The electrodes can be used in different types of fuel cells, and preferably are used in regenerative fuel cells, e.g., hydrogen/bromine regenerative fuel cells.

The porous electrode can comprise a gas diffusion layer, characterized by the reactant or/and the product being a gas ($H_2$ in the case of HTBFC) and catalytic layer, having a highly dispersed catalytic powder mixed with polymeric binder, e.g., PVDF (polyvinylidene fluoride) and PTFE (polytetrafluoroethylene) ionomer such as Nafion™ polymer. The reaction can take place at the three-phase zone, where gas and liquid electrolyte react on a solid catalyst surface.

The anodes and cathodes useful in this disclosure can comprise a catalyst layer and a porous backing layer. A preferred catalyst used at the anode is, for example, nano sized Pt—Ir alloy powder. A preferred catalyst used at the cathode is, for example, the same nano sized Pt—Ir alloy powder as used at the anode. The cathode can be without a catalyst, e.g., carbon only. The core-shell structure (or a skin structure) catalysts include sub-monolayers, atom islands, and one or more layers of a precious metal, e.g., Pt or Ir, and alloys thereof, with or without other elements. In such alloys used in the core-shell structure (or a skin structure) catalysts, the ratio between platinum or iridium and the metal (Pt:M or Ir:M atomic ratio) is between about 1:10 to about 10:1.

The backing layer is preferably made of carbon. This backing layer is porous and is used for support and at the same time for making electrical contact between the housing and the catalyst powder, which by itself is connected to the membrane.

As a result of long operation, the bond between the catalyst particles and the supporting carbon matrix is lost, leading to the degradation of the fuel cell. In view of that it is proposed in this disclosure to bind the nano size catalyst to a nano size ceramic powder and subsequently hind the obtained particles to the carbon backing layer and to the PCM. A good way to perform this is to use the well-known commercially available electroless process. According to this process, up to one monolayer of a catalyst salt (like $PtCl_4$, $RuCl_3$, etc.) is adsorbed in the first step on nano size hydrated silica powder by immersing the powder in a solution containing a predetermined amount of the catalyst salt. Then, in the second step, a proper amount of a reducing agent like formaldehyde, methanol, formic acid or hypophosphite is added at a suitable pH and temperature to form up to one monolayer of catalyst bonded to the surface of the ceramic powder. This monolayer provides nucleation sites for further deposition. Next, one or several catalyst salts and more reducing agents are added to form the final size and structure of the catalyst particles. For the anode it is preferred to form either a Pt—Ru or Pt—Ir alloy catalyst layer or to form two consecutive layers of either Pt on Ru or Pt on Ir with atomic ratio of 1:10 to 10:1. Other elements, like Sn, Mo, or Ni can be added to the catalyst layer to further improve reaction kinetics. Catalyst layers for the anode and cathode can be the same or different.

For the anodes useful in this disclosure, the catalyst comprises at least one precious metal. The catalyst is capable of catalyzing a charging reaction and a discharging reaction in a regenerative fuel cell, e.g., a hydrogen/bromine regenerative fuel cell. The catalyst is also capable of catalyzing hydrogen redox reactions. Further, the catalyst is capable of catalyzing HERs and HORs. Particularly, the catalyst is capable of catalyzing HERS and HORs in harsh environments, e.g., in the presence of a halogen ion or a mixture of halogen ions.

For the anodes useful in this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anodes useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports useful in this disclosure can have any number of possible porosities and/or void spaces associated therewith.

The anode can comprise a carbon support layer, optionally a gas diffusion layer, and a catalytic layer. The catalytic layer can be coated onto the carbon support layer. The gas diffusion layer can be coated onto the carbon support layer and the catalytic layer can be coated onto the gas diffusion layer. The catalytic layer can also be coated onto the solid electrolyte membrane or proton conducting membrane.

For the cathodes useful in this disclosure, the catalyst comprises carbon powder and/or at least one precious metal and carbon powder. The cathode can be without a catalyst, e.g., carbon only. The catalyst is capable of catalyzing, in the presence of a halogen ion or a mixture of halogen ions, a charging reaction and a discharging reaction in a regenerative fuel cell, e.g., a hydrogen/bromine regenerative fuel cell. The catalyst is also capable of catalyzing halogen/halide redox reactions.

For the cathodes useful in this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal. Preferably, the catalyst includes PtRe, PdRe, Pt/Ir, Pd/Ir, Pt/Ru, (PtIr)/Ru, Ir/Ru, (PtRe)/Ir, and (PtRu)/Ir. The catalyst useful in this disclosure include those where the at least one precious metal is supported on carbon powder or ceramic powder.

For the cathodes useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore arrays having selected pore diameters, depths, and distances relative to one another. The cathode supports useful in this disclosure can have any number of possible porosities and/or void spaces associated therewith.

The cathode can comprise a carbon support layer, optionally a microporous layer, and optionally a catalytic layer. The catalytic layer can be coated onto the carbon support layer. The microporous layer can be coated onto the carbon support layer and the catalytic layer can be coated onto the microporous layer. The catalytic layer can also be coated onto the solid electrolyte membrane or proton conducting membrane.

This disclosure provides a membrane electrode assembly (MEA) that comprises an anode, a cathode and a solid electrolyte membrane disposed between the anode and the cathode. The anode comprises a support and a catalyst dispersed thereon, wherein the catalyst comprises at least one precious metal. The cathode comprises a support and a carbon powder or catalyst dispersed with or on a carbon powder, wherein the catalyst comprises at least one precious metal or carbon powder. The catalyst dispersed on the anode and the catalyst dispersed on the cathode are the same or different and are capable of catalyzing, in the presence of a halogen ion or a mixture of halogen ions, a charging reaction and a discharging reaction in a regenerative fuel cell, e.g., a hydrogen/bromine regenerative fuel cell.

In the MEA, the catalyst dispersed on the anode and the catalyst dispersed on the cathode are capable of catalyzing hydrogen redox reactions and halogen/halide redox reactions. Also, in the MEA, the catalyst dispersed on the anode and the catalyst dispersed on the cathode are capable of catalyzing a charging reaction and a discharging reaction in a regenerative fuel cell in the presence of a halogen ion or a mixture of halogen ions.

In the MEA, a preferred solid electrolyte membrane is a proton conducting membrane having pores with a diameter size which is essentially smaller than 30 nm. The solid proton conducting membrane comprises: (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxygen and said fuel; and (iii) 10 to 90% by volume of an acid or aqueous acid solution.

The solid proton conducting membranes useful in the fuel cells useful in this disclosure are described in U.S. Pat. Nos. 6,447,943 and 6,492,047, which are incorporated herein in their entirety by reference thereto. The polymeric binders used in these membranes are selected from the group consisting of: poly(vinylidenfluoride), poly(vinylidenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), Kel F™ and any combinations thereof.

The inorganic nanosize powder used for preparing the solid proton conducting membrane is selected from the group consisting of $SiO_2$, $ZrO_2$, $B_2O_3$, $TiO_2$, $Al_2O_3$, hydroxides and oxy-hydroxides of Ti, Al, B and Zr, and any combinations thereof.

The proton conducting membranes useful in the fuel cells useful in this disclosure also comprise an acid or aqueous acid solution. As opposed to the solid electrolyte membrane described, for example, in U.S. Pat. No. 5,599,638, which is incorporated herein by reference thereto in its entirety, wherein no acid is present in free form, the solid electrolyte membrane discussed here, when used in the fuel cells, contains free acid molecules entrapped in the pores of the membrane. Alternatively, it may contain acid molecules bonded to the inorganic powder. The typical diameter of these pores is essentially smaller than 30 nm, preferably smaller than 20 nm, and more preferably smaller than 3 nm.

A large variety of low vapor pressure acids that are compatible with the cell hardware and with the catalysts at both electrodes can be used and adapted to a specific application. The following list of acids is given for example: polyfluoroolefin sulfonic acid, perfluoroolefin sulfonic acid, polyfluoroaryl sulfonic acids such as polyfluorobenzene, polyfluorotoluene, or polyfluorostyrene sulfonic acid, perfluoroaryl sulfonic acids such as perfluorobenzene, perfluorotoluene or perfluorostyrene sulfonic acid, similar acids where up to 50% of the hydrogen or fluorine atoms were replaced by chlorine atoms, $CF_3(CF_2)_nSO_3H$, $HO_3S(CF_2CH_2)_nSO_3H$, $CF_23(CF_2CH_2)_nSO_3H$, $HO_3S(CF_2)_nSO_3H$, where n is an integer having a value of 1 to 9, Nafion™ ionomers, HCl, HBr, phosphoric acid, sulfuric acid, and mixtures thereof.

Alternatively, the solid electrolyte membrane is a proton conducting membrane (PCM) comprising pores with a typical diameter size which is essentially smaller than 50 nm, preferably smaller than 3 nm, and more preferably smaller than 1.5 nm.

A further membrane according to the present disclosure is film made of a proton conducting matrix as described in U.S. Pat. No. 6,811,911, which is incorporated herein in its entirety by reference thereto. The ion conducting matrix comprises: (i) 5% to 60% by volume of an inorganic powder having a good aqueous electrolyte absorption capacity; (ii) 5% to 50% by volume of a polymeric binder that is chemically compatible with an aqueous electrolyte; and (iii) 10 to 90% by volume of an aqueous electrolyte, wherein the inorganic powder comprises essentially sub-micron particles, preferably from about 5 to about 150 nm in size. The matrix of the present disclosure may, optionally, comprise between about 0.1% to about 25% of a non-volatile liquid lubricant that is chemically compatible with all the components in the matrix.

In accordance with a preferred embodiment of the present disclosure, the inorganic powder is characterized in that it has a surface area of at least 10 $m_2/g$, and possesses a good absorption capability for the aqueous electrolyte.

The PCM of the present disclosure has the general appearance of a plastic film having good mechanical properties. It can typically be bent to about 180° with no substantial fractures occurring, and it can be prepared in thickness being in the range of from about 10 to about 1000 microns or more. Due to its stability and good ionic conductivity, it can be used at a large temperature range of from sub-zero to about 150° C.

According to a preferred embodiment of the disclosure, where the matrix is in the preparation of a membrane, the inorganic powder comprised in the matrix is a very fine, electronically non-conductive powder having a particle size of preferably less than 150 nm. According to this embodiment, the PCM pores in which the aqueous electrolyte is absorbed are very small, and their characteristic dimension is essentially smaller than 50 nm.

The absorption capacity or the retention capability of the membrane for the acid or the aqueous electrolyte used depends on several parameters, among which are the composition and the type of the inorganic powder, the polymeric binder and the type of the dissolved acid or electrolyte. The combination of these parameters should be optimized in order to tailor the product for each application. While carrying out such optimization, consideration should be given to the fact that the highest the content of inorganic powder is the inferior the mechanical properties become. Increasing the inorganic powder content of the matrix increases its electrolyte retention characteristic, but at the same time, decreases its mechanical strength. On the other hand, increasing the polymeric binder in the matrix increases the strength of the latter, but decreases the wettability of the matrix thus turning it to a less conductive one.

According to yet another embodiment of the disclosure, an improvement of the matrix wettability and consequently the electrolyte retention, is achieved by adding to the membrane multi valance metal salts such as Al, Zr, B, Ti and the like.

According to another embodiment of the disclosure, the improvement of the matrix wettability and consequently the electrolyte retention is achieved by pre-treating the inorganic powder with an acid or a base prior to the preparation of the membrane.

This disclosure also relates to a process for producing a proton-conducting membrane (PCM), the process comprising: mixing (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxidizer and the fuel; and (iii) 10 to 90% by volume of an acid or aqueous acid solution, wherein the mixing is conducted at various rate steps, thereby producing a proton-conducting mixture; continuously casting the proton-conducting mixture on rolled paper, non-woven matrix or any other coatible material at ambient temperature; drying the casted proton-conducting mixture at a temperature of greater than 100° C. for approximately 5 to 60 minutes, thereby forming a dry film; laminating a plurality of the dry films together under pressure, and thereafter extracting pore-former out of pores of the dry films, thereby forming the proton-conducting membrane having an average pore size of less than 30 nanometers.

The PCM of the present disclosure comprises a nanosize ceramic powder with good acid adsorption capacity, a polymer binder, and an acid absorbed in nanosize pores. This PCM is particularly useful in regenerative fuel cell (RFC) applications.

The main components of the PCM are a polymeric binder, an inorganic nanosize powder, and an acidic solution or acid. The typical diameter of the PCM pores is about between 1.5 to 30 nm, preferably 3 nm. The pores are filled with free acid molecules, which is a major advantage for the application of energy storage system (e.g., RFC applications) that uses an acidic electrolyte.

The reagents (i.e., powders and solvents) are mixed with additives that improve the quality of the solution and results in better mechanical and physical properties of the cast film. The solution is then cast using a mechanical coater, which is a more efficient process and more homogeneous one.

Preferably, at least 2 to 6, preferably 4, of the dry films are laminated together. The various rate steps of the mixing step comprises: mixing for between 1 to 5 hours at a mixing rate of between about 100 to 500 rpm at room temperature; mixing for between 10 to 20 hours at a mixing rate of between about 400 to 700 rpm at a temperature in the range between about 30 to 50° C.; mixing for between 10 to 20 hours at a mixing rate of between about 100 to 400 rpm at room temperature; and degassing for between 5 to 30 minutes at a temperature in the range between about 30 to 50° C. The step of continuously casting the proton-conducting mixture is performed using a coater machine for solution application over the rolled paper, non-woven matrix or the like roll to roll carrier support.

The carrier support is a siliconized paper, and the rolling speed of the carrier support is set according to the specific gravity of the proton-conducting mixture.

The dry film has a thickness between about 40 to 60 micrometers, more preferably between about 50 to 55 micrometers.

Preferably, the step of laminating the dry films is performed at the pressure in the range between about 5 to 20 kg/cm$^2$ and at a temperature in the range between about 130 to 150° C. for between about 3 to 10 minutes.

The process further comprising adding at least one rheology control agent prior to mixing. The rheology control agent is at least one selected from the group consisting of: SPAN80 (generic chemical description sorbitan monooleate, $C_{24}H_{44}O_6$), and Zonyl® FSN (generic chemical description $(C_2H_4O)_x(CF_2)_yC_2H_5FO$, nonionic fluorosurfactant).

The extraction step comprises: (a) immersing the proton-conducting membrane with pore-former in an ether/ethanol mixture for a period of time sufficient to remove the pore-former from the pores of the proton-conducting membrane; (b) immersing the proton-conducting membrane from step (a) in ethanol to remove any residual pore-formers and other solvents; and (c) immersing the proton-conducting membrane in water to remove the ethanol from the pores.

The ether/ethanol mixture has a ratio of between about 1:9 to 3:7. The immersing step (a) takes place for between about 1 to 5 hours. The immersing step (b) takes place for between about 1 to 5 hours.

The polyfluoroaryl sulfonic acid is at least one selected from the group consisting of: polyfluorobenzene, polyfluorotoluene, and polyfluorostyrene sulfonic acid. The perfluoroaryl sulfonic acid is at least one selected from the group consisting of: perfluorobenzene, perfluorotoluene and perfluorostyrene sulfonic acid.

The process further comprising a pore-former selected from the group consisting of: DBP (i.e. dibutyl phthalate), diethyl phthalate, dimethylphthalate, propylene carbonate, ethylene carbonate and the like or any combinations thereof.

The process further comprising the step of recapturing the acid or aqueous acid solution.

The PCMs used in the fuel cells useful in this disclosure have good ionic conductivity, are not affected by heavy metals impurities, and can be used at temperatures even higher than 100° C. or lower than 0° C.

Nanoporous-proton conducting membranes (NP-PCM) employed in the MEAs useful in this disclosure allow water management which prevents porous electrodes from flooding. This makes such electrodes advantageous for use in the fuel cells useful in this disclosure.

In the MEA, the catalyst dispersed on the anode is capable of catalyzing hydrogen redox reactions—HERs and HORs. Further, the catalyst dispersed on the anode is capable of catalyzing HERs and HORs in the presence of a halogen ion or a mixture of halogen ions.

For the anode in the MEA useful in this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anode in the MEA useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports useful in this disclosure can have any number of possible porosities and/or void spaces associated therewith.

In the MEA, the catalyst dispersed on the cathode is capable of catalyzing halogen/halide redox reactions.

For the cathode in the MEA useful in this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal.

Preferably, the catalyst includes PtRe, PdRe, Pt/Ir, Pd/Ir, Pt/Ru, (PtIr)/Ru, Ir/Ru, (PtRe)/Ir, and (PtRu)/Ir. The catalyst useful in this disclosure include those where the at least one precious metal is supported on carbon powder or ceramic powder.

For the cathode in the MEA useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore arrays having selected pore diameters, depths, and distances relative to one another. The cathode supports useful in this disclosure can have any number of possible porosities and/or void spaces associated therewith.

This disclosure provides a regenerative fuel cell comprising a housing; a solid electrolyte membrane having a first surface and a second surface, disposed in the housing to partition it into an anode side and a cathode side; an anode formed on the first surface so as to connect the first surface to the anode side; and a cathode formed on the second surface so as to connect the second surface to the cathode side. The anode comprises a support and a catalyst dispersed thereon. The catalyst dispersed on the anode comprises at least one precious metal. The cathode comprises a support and a catalyst dispersed thereon. The catalyst dispersed on the cathode comprises at least one precious metal or carbon powder, or mixture thereof. The catalyst dispersed on the anode and the catalyst dispersed on the cathode are the same or different and are capable of catalyzing, in the presence of a halogen ion or a mixture of halogen ions, a charging reaction and a discharging reaction in the regenerative fuel cell, e.g., a hydrogen/bromine regenerative fuel cell.

In the regenerative fuel cell, the catalyst dispersed on the anode and the catalyst dispersed on the cathode are capable of catalyzing hydrogen redox reactions and halogen/halide redox reactions. Also, in the regenerative fuel cell, the catalyst dispersed on the anode and the catalyst dispersed on the cathode are capable of catalyzing a charging reaction and a discharging reaction in the regenerative fuel cell in the presence of a halogen ion or a mixture of halogen ions.

Nanoporous-proton conducting membranes (NP-PCM) employed in the regenerative fuel cells useful in this disclosure allow water management which prevents porous electrodes from flooding. This makes such electrodes advantageous for use in the fuel cells useful in this disclosure.

Generally, single cells are combined into a fuel cell stack to produce the desired level of electrical power.

This disclosure provides a regenerative fuel cell comprising a solution compartment, a gas compartment and a MEA disposed between the solution compartment and the gas compartment. The MEA comprises an anode, a cathode and a solid electrolyte membrane disposed between the anode and the cathode. The anode faces the gas compartment and the cathode faces the solution compartment. The anode comprises a support and a catalyst dispersed thereon, wherein the catalyst comprises at least one precious metal. The cathode comprises a support and a catalyst dispersed thereon, wherein the catalyst comprises at least one precious metal or carbon powder. The catalyst dispersed on the anode and the catalyst dispersed on the cathode are the same or different and are capable of catalyzing, in the presence of a halogen ion or a mixture of halogen ions, a charging reaction and a discharging reaction in the regenerative fuel cell.

A hydrogen/bromine (tribromide) regenerative electrochemical cell is well suited for energy storage applications such as peak shaving, load management and other emerging distributed utility applications. A regenerative hydrogen/bromine cell facilitates electrical energy storage by consuming electricity in electrolyzing hydrogen bromide into hydrogen and tribromide and some bromine reactants as stored chemical energy. The hydrogen and tribromide are later reacted electrochemically in the cell to produce electrical energy. Hence, the cell is regenerative (reversible), in that it can efficiently operate as an electrolysis cell producing reactants and consuming electricity or a fuel cell consuming reactants and producing electricity. The cell exchanges electrical and chemical energy.

The hydrogen/tribromide regenerative electrochemical cell offers several advantages, for example, the hydrogen and bromine electrodes are fully reversible allowing very high electric-to-electric efficiencies. The same electrodes can be used as electrocatalysts for both chemical and electricity generation and therefore, the same cell can be used for both functions. The cell is capable of operating at a high current and high power density in both charging and discharging modes, resulting in lower capital costs. The reactants for chemical and electricity generation are stored separately from the cell which makes it cost effective for both peaking and load leveling (e.g., weekly cycle) and low cost capacity (kWh) increases.

The electrochemical reactions for the hydrogen/tribromide cycle take place in a charge mode and a discharge mode. During charge, hydrogen bromide is electrolyzed into hydrogen and tribromide (with minor amounts of bromine). These fluids are then stored separately outside the electrochemical cell. Since all reactants are stored external from the cell, independent sizing for power and energy storage becomes a distinct advantage. During discharge, the hydrogen and tribromide solution are delivered to the cell, where they react electrochemically to produce electric power and hydrogen bromide.

During charge (electrolysis), concentrated hydrobromic acid is electrolyzed and tribromide is formed at the positive electrode. Hydrated protons are transported across the membrane, and hydrogen gas is formed at the negative electrode. The hydrogen and tribromide that are formed during the charge mode are stored external to the cell, and they are fed back to the cell during the discharge (fuel cell) mode to produce electrical energy.

The quantity of tribromide species and minor amount of soluble free bromine available in the solution establishes the discharge capacity of the positive electrode in a hydrogen/tribromide fuel cell. A large mass of tribromide is ordinarily desirable in order to maximize the overall fuel cell capacity.

This disclosure provides a fuel cell comprising an anode, a cathode and a solid electrolyte membrane disposed between the anode and the cathode. The anode comprises a support and a catalyst dispersed thereon, wherein the catalyst comprises at least one precious metal. The cathode comprises a support and a catalyst dispersed thereon. The catalyst comprises carbon powder or at least one precious metal with or on carbon powder. The catalyst dispersed on the anode and the catalyst dispersed on the cathode are the same or different and are capable of catalyzing, in the presence of a halogen ion or a mixture of halogen ions, a reaction between a fuel and an oxidant to generate an electric current.

Nanoporous-proton conducting membranes (NP-PCM) employed in the fuel cells useful in this disclosure allow water management which prevents porous electrodes from flooding. This makes such electrodes advantageous for use in the fuel cells useful in this disclosure.

The fuels useful in the fuel cells useful in this disclosure are conventional materials and include, for example, hydrogen and alcohols. The oxidants useful in the fuel cells useful in this disclosure are conventional materials and include, for example, oxygen, bromine, chlorine and chlorine dioxide.

Various modifications and variations of this disclosure will be obvious to a worker skilled in the art and it is to be understood that such modifications and variations are to be included within the purview of this application and the spirit and scope of the claims.

EXAMPLES

Example 1

Preparation of Hydrophobic Silica Beads Coated with Reactive Catalyst for Corrosive Vapor Elimination 30 grams of 1/8" diameter silica beads with low surface area of 0.11 $m^2/g$ were placed in oven for 1 hour at 100° C. for moisture removal. The resulting product was placed in a beaker. A 16.5 ml volumetric 1:1 solution of 60 wt % polytetrafluoroethylene (PTFE) and water was mixed until it was fully homogenized. The resulting solution was used to soak the dry silica by the incipient wetness method. The product was them placed in oven for liquid removal and PTFE curing for 15 minutes at 350° C. The final PTFE weight addition was measured to be 19%. The hydrophobic silica beads were then incipient wetted with a catalyst ink prepared from known ratios of isopropyl alcohol, tetra butyl ammonium hydroxide, per-fluoro ionic polymer and oxidation catalyst. The catalyst weight percent was calculated to be 0.5% of the total silica weight. The finished product was cured in oven for 1 hour at 140° C.

Example 2

Reaction Between Bromine ($Br_2$) and Excess Hydrogen ($H_2$) at the Outlet of the Fuel Cell Stack The reaction is depicted as follows: $H_2+Br_2=2HBR$ $\Delta H_f=-36.29$ kJ/mol. This reaction takes place in the presence of a catalyst embedded on the surface of supporting beads. The HBr formed in the exothermic reaction is removed from the reactor by the remaining hydrogen stream in form of droplets or vapors.

Example 3

Removal of Bromine from Hydrogen Rich Bromine Vapor

Figure 5:
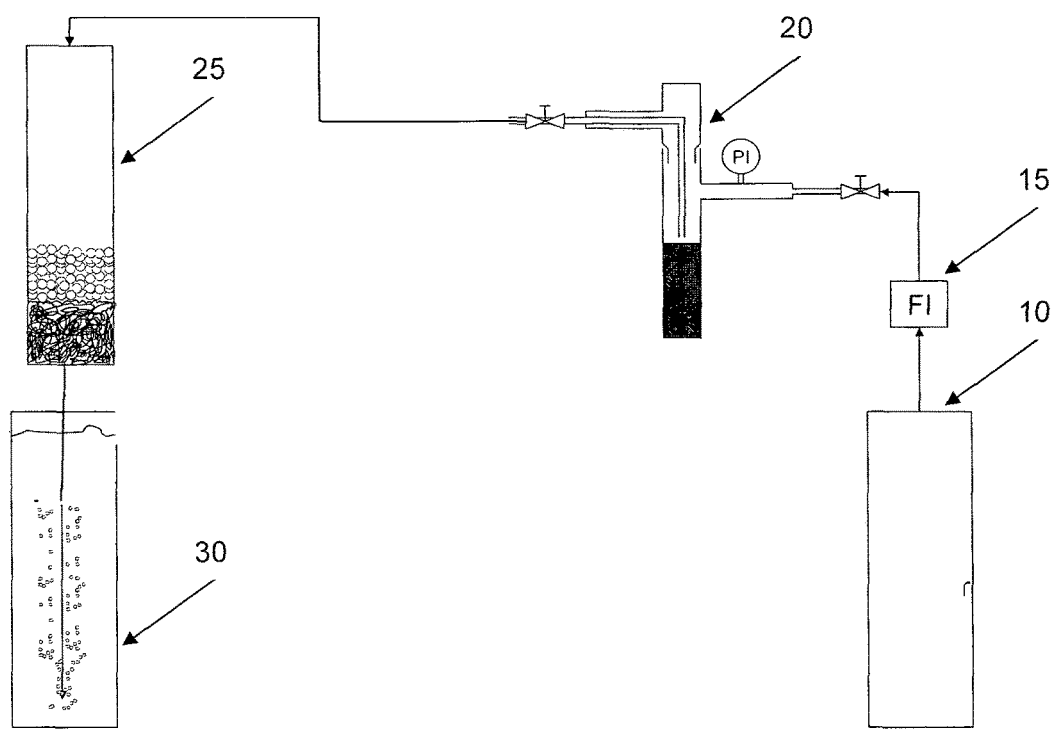
FIG. 5 is a schematic representation of the apparatus used in Example 3.

Referring to FIG. 5, dry hydrogen supplied from cylinder 10 was passed through flow meter 15, and into a bromine vapor rich tube device 20 having a temperature that varied from ambient to 45° C. The hydrogen rich bromine vapor then passed into another glass tube 25, with known amount of catalyst supported on hydrophobic silica beads. The reacted hydrogen was then bubbled in a water cylinder 30. The residence time of the gas passing through the catalyst was 1 second. The bromine content in the gas stream before entering the reaction tube was 10,000 ppmwt. The outlet stream bromine content was also tested and measured to be below 4 ppmwt (4 ppmwt is the measuring device lower limit). The experiment lasted for 3 months. During the experiment, total bromine weight of more than 2 times was treated by the catalyst. This is an indication that the bromine was not adsorbed but rather reacted on the catalyst.

Example 4

Removal of Bromine from Hydrogen Rich Bromine Vapor

Bromine content at the hydrogen outlet stream of the actual fuel cell was measured to be below 1000 ppmwt. After a hydrogen purifier was placed at the outlet stream, no bromine residuals were detected.

Example 5

Gas Phase Reaction Between Bromine Vapor and Hydrogen

Figure 6:
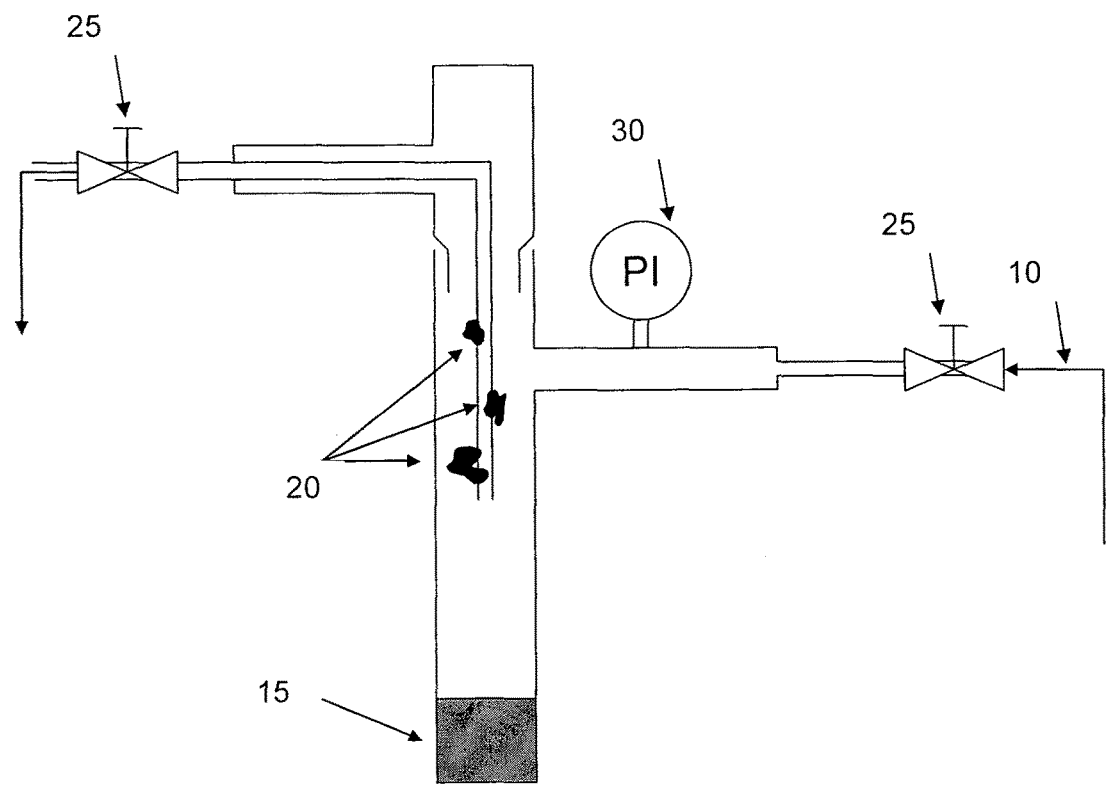
FIG. 6 is a schematic representation of the apparatus used in Example 5.

Referring to FIG. 6, the gas phase reaction between bromine vapor and hydrogen gas was tested. A dry hydrogen inlet 10 extends into vacuum chamber filled with bromine solution 15. The tube was cupped by top cover containing reaction catalyst embedded on carbon cloth 20. The catalyst samples kept hanging on the gas phase. The chamber was sealed by valves 25, and the pressure was measured by an indicator 30. The pressure reduced gradually up to 80 mmHg. In a similar test, the same apparatus was used, but this time without catalyst. The results showed no pressure reduction. The results of pressure measurements in the 2 sets of experiments shows that hydrogen gas and bromine vapors react in the presence of catalyst. The pressure stopped reducing in the first test only when the hydrogen fully reacted (consumed) over the catalyst.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. An energy storage and generation system comprising:
at least one vessel suitable for holding an electrolyte;
at least one vessel suitable for holding a gas;
one or more stacks of regenerative fuel cells, said regenerative fuel cells comprising a housing; a proton conducting membrane having a first surface and a second surface, disposed in said housing to partition it into an anode side and a cathode side; an anode disposed on said first surface so as to connect said first surface to the anode side; a cathode disposed on said second surface so as to connect said second surface to the cathode side; said anode comprising a support and a catalyst dispersed thereon; said cathode comprising a carbon powder or a support and a catalyst dispersed thereon; wherein the catalyst dispersed on said anode support and the catalyst dispersed on said cathode support are the same or different and are capable of catalyzing, in the presence of an electrolyte or mixture of electrolytes, a charging reaction and a discharging reaction in said regenerative fuel cells;
wherein said at least one vessel suitable for holding an electrolyte is in fluid communication with said one or more stacks of regenerative fuel cells, and said one or more stacks of regenerative fuel cells are in fluid communication with said at least one vessel suitable for holding an electrolyte, to form at least an electrolyte circulation loop;
wherein said at least one vessel suitable for holding a gas is in fluid communication with said one or more stacks of regenerative fuel cells, and said one or more stacks of regenerative fuel cells are in fluid communication with said at least one vessel suitable for holding a gas, to form at least a gas circulation loop; and
wherein said proton conducting membrane has pores with a diameter size which are smaller than 30 nm and comprises: (i) 5% to 60% by volume of an electrically nonconductive inorganic powder having acid absorption capacity, wherein the powder comprising essentially sub-micron particles; (ii) 5% to 50% by volume of a polymeric binder that is chemically compatible with acid, oxygen and fuel; and (iii) 10 to 90% by volume of an acid or aqueous acid solution;
wherein the one or more stacks of regenerative fuel cells further comprise (i) an electrolyte feed inlet opening and an electrolyte feed line extending from the electrolyte feed inlet opening exteriorly from the one or more stacks of regenerative fuel cells, said electrolyte feed line in fluid communication with said at least one vessel suitable for holding an electrolyte, for delivery of electrolyte into the one or more stacks of regenerative fuel cells; and (ii) an electrolyte discharge outlet opening and an electrolyte discharge line extending from the electrolyte discharge outlet opening exteriorly from the one or more stacks of regenerative fuel cells, said electrolyte discharge line in fluid communication with said at least one vessel suitable for holding an electrolyte, for removal of electrolyte from the one or more stacks of regenerative fuel cells;
wherein at least a portion of the electrolyte feed line adjacent to the electrolyte feed inlet opening has a coiled configuration, and at least a portion of the electrolyte discharge line adjacent to the electrolyte discharge outlet opening has a coiled configuration; and
wherein the diameter and length of at least a portion of the electrolyte feed line adjacent to the electrolyte feed inlet opening having a coiled configuration, and the diameter and length of at least a portion of the electrolyte discharge line adjacent to the electrolyte discharge outlet opening having a coiled configuration, are determined by the equation $$R = 3.14 * (D/2)^2 * X * S$$

(Volts)—the total voltage in the array of stacks connected in series,
I (Amp)—the operating current of each stack,
L (%)—approved percentage of shunt current losses in the system,
IL (Amp)—current losses by shunt=I*L,
R (Ohm)—tubing ionic resistance=V/IL,
S (Ohm/cm$^3$)—solution resistance,
D (cm)—tubing diameter, and
X (cm)—tubing length.

2. The energy storage and generation system of claim 1 wherein the electrolyte circulation loop comprises one or more valves, one or more pumps, and a pressure equalizing line, and wherein the gas circulation loop comprises one or more valves, one or more pumps, a gas purifier, a liquid absorber, a gas circulation ejector, and a gas compressor.

3. The energy storage and generation system of claim 1 wherein the diameter and length of at least a portion of the electrolyte feed line adjacent to the electrolyte feed inlet opening having a coiled configuration, and the diameter and length of at least a portion of the electrolyte discharge line adjacent to the electrolyte discharge outlet opening having a coiled configuration, can the same or different.

4. The energy storage and generation system of claim 1 wherein the electrolyte comprises an acid, a mixture of acids, an iron salt and conjugated acid thereof, or a mixture of iron salts and conjugated acids thereof; and wherein the gas comprises hydrogen.

5. The energy storage and generation system of claim 1 wherein stacks of regenerative fuel cells are increased or decreased to produce the desired level of electrical power.

6. The energy storage and generation system of claim 1 wherein the stacks of regenerative fuel cells are connected mechanically in series or electronically in series.

7. The energy storage and generation system of claim 6 wherein the stacks of regenerative fuel cells that are connected electronically in series are connected by an electronic appliance having an input that is not electrically connected to its output; wherein the electronic appliance is a DC/DC converter or a DC/AC converter.

8. The energy storage and generation system of claim 1 further comprising a gas purifier containing a catalyst sufficient to reduce or eliminate corrosive elements from the gas.

9. The energy storage and generation system of claim 1 wherein the electrolyte and gas are maintained at a different pressure inside the one or more fuel cell stacks.

10. The energy storage and generation system of claim 1 wherein the proton conducting membrane has pores with a diameter size which are smaller than 20 nm and comprises: (i) 5% to 60% by volume of an electrically nonconductive inorganic powder having acid absorption capacity, wherein the powder comprising essentially sub-micron particles from about 5 to about 150 nm in size; (ii) 5% to 50% by volume of a polymeric binder that is chemically compatible with acid, oxygen and fuel; and (iii) 10 to 90% by volume of an acid or aqueous acid solution.

11. The energy storage and generation system of claim 1 wherein, for the anode comprising a support and a catalyst dispersed thereon, the catalyst comprises at least one precious metal.

12. The energy storage and generation system of claim 1 wherein, for the cathode comprising a carbon powder or a support and a catalyst dispersed thereon, the catalyst comprises carbon powder or at least one precious metal with carbon powder.

13. The energy storage and generation system of claim 1 wherein the catalyst dispersed on said anode and the catalyst dispersed on said cathode are the same or different and are capable of catalyzing, in the presence of a halogen ion or a mixture of halogen ions, a charging reaction and a discharging reaction in said regenerative fuel cells.

14. The energy storage and generation system of claim 1 which comprises a flow battery or a hydrogen fuel cell.

15. A energy storage and generation system comprising:
(a) at least one vessel suitable for holding an electrolyte; at least one vessel suitable for holding a gas;
one or more stacks of regenerative fuel cells comprising a solution or electrolyte compartment, a gas compartment and a membrane electrode assembly (MEA) disposed between said solution or electrolyte compartment and said gas compartment; wherein said membrane electrode assembly (MEA) comprises an anode, a cathode and a proton conducting membrane disposed between said anode and said cathode; said anode facing the gas compartment and said cathode facing the solution or electrolyte compartment; said anode comprising a support and a catalyst dispersed thereon; said cathode comprising a carbon powder or a support and a catalyst dispersed thereon; wherein the catalyst dispersed on said anode support and the catalyst dispersed on said cathode support are the same or different and are capable of catalyzing, in the presence of an electrolyte or mixture of electrolytes, a charging reaction and a discharging reaction in said regenerative fuel cell;

wherein said at least one vessel suitable for holding an electrolyte is in fluid communication with said one or more stacks of regenerative fuel cells, and said one or more stacks of regenerative fuel cells are in fluid communication with said at least one vessel suitable for holding an electrolyte, to form at least an electrolyte circulation loop;

wherein said at least one vessel suitable for holding a gas is in fluid communication with said one or more stacks of regenerative fuel cells, and said one or more stacks of regenerative fuel cells are in fluid communication with said at least one vessel suitable for holding a gas, to form at least a gas circulation loop;

wherein said proton conducting membrane has pores with a diameter size which are smaller than 30 nm and comprises: (i) 5% to 60% by volume of an electrically nonconductive inorganic powder having acid absorption capacity, wherein the powder comprising essentially sub-micron particles; (ii) 5% to 50% by volume of a polymeric binder that is chemically compatible with acid, oxygen and fuel; and (iii) 10 to 90% by volume of an acid or aqueous acid solution;

wherein the one or more stacks of regenerative fuel cells further comprise (i) an electrolyte feed inlet opening and an electrolyte feed line extending from the electrolyte feed inlet opening exteriorly from the one or more stacks of regenerative fuel cells, said electrolyte feed line in fluid communication with said at least one vessel suitable for holding an electrolyte, for delivery of electrolyte into the one or more stacks of regenerative fuel cells; and (ii) an electrolyte discharge outlet opening and an electrolyte discharge line extending from the electrolyte discharge outlet opening exteriorly from the one or more stacks of regenerative fuel cells, said electrolyte discharge line in fluid communication with said at least one vessel suitable for holding an electrolyte, for removal of electrolyte from the one or more stacks of regenerative fuel cells;

wherein at least a portion of the electrolyte feed line adjacent to the electrolyte feed inlet opening has a coiled configuration, and at least a portion of the electrolyte discharge line adjacent to the electrolyte discharge outlet opening has a coiled configuration; and wherein the diameter and length of at least a portion of the electrolyte feed line adjacent to the electrolyte feed inlet opening having a coiled configuration, and the diameter and length of at least a portion of the electrolyte discharge line adjacent to the electrolyte discharge outlet opening having a coiled configuration, are determined by the equation $$R=3.14*(D/2)^2*X*S$$

V (Volts)—the total voltage in the array of stacks connected in series,
I (Amp)—the operating current of each stack,
L (%)—approved percentage of shunt current losses in the system,
IL (Amp)—current losses by shunt=I*L,
R (Ohm)—tubing ionic resistance=V/IL,
S (Ohm/cm$^3$)—solution resistance,
D (cm)—tubing diameter, and
X (cm)—tubing length; or
(b) at least one vessel suitable for holding an electrolyte;
at least one vessel suitable for holding a gas;
one or more stacks of regenerative fuel cells comprising an anode, a cathode and a proton conducting membrane disposed between said anode and said cathode; said anode comprising a support and a catalyst dispersed thereon; said cathode comprising a carbon powder or a support and a catalyst dispersed thereon; wherein the catalyst dispersed on said anode support and the catalyst dispersed on said cathode support are the same or different and are capable of catalyzing, in the presence of an electrolyte or mixture of electrolytes, a reaction between a fuel and an oxidant to generate an electric current;
wherein said at least one vessel suitable for holding an electrolyte is in fluid communication with said one or more stacks of regenerative fuel cells, and said one or more stacks of regenerative fuel cells are in fluid communication with said at least one vessel suitable for holding an electrolyte, to form at least an electrolyte circulation loop;
wherein said at least one vessel suitable for holding a gas is in fluid communication with said one or more stacks of regenerative fuel cells, and said one or more stacks of regenerative fuel cells are in fluid communication with said at least one vessel suitable for holding a gas, to form at least a gas circulation loop;
wherein said proton conducting membrane has pores with a diameter size which are smaller than 30 nm and comprises: (i) 5% to 60% by volume of an electrically nonconductive inorganic powder having acid absorption capacity, wherein the powder comprising essentially sub-micron particles; (ii) 5% to 50% by volume of a polymeric binder that is chemically compatible with acid, oxygen and fuel; and (iii) 10 to 90% by volume of an acid or aqueous acid solution;
wherein the one or more stacks of regenerative fuel cells further comprise (i) an electrolyte feed inlet opening and an electrolyte feed line extending from the electrolyte feed inlet opening exteriorly from the one or more stacks of regenerative fuel cells, said electrolyte feed line in fluid communication with said at least one vessel suitable for holding an electrolyte, for delivery of electrolyte into the one or more stacks of regenerative fuel cells; and (ii) an electrolyte discharge outlet opening and an electrolyte discharge line extending from the electrolyte discharge outlet opening exteriorly from the one or more stacks of regenerative fuel cells, said electrolyte discharge line in fluid communication with said at least one vessel suitable for holding an electrolyte, for removal of electrolyte from the one or more stacks of regenerative fuel cells;
wherein at least a portion of the electrolyte feed line adjacent to the electrolyte feed inlet opening has a coiled configuration, and at least a portion of the electrolyte discharge line adjacent to the electrolyte discharge outlet opening has a coiled configuration; and
wherein the diameter and length of at least a portion of the electrolyte feed line adjacent to the electrolyte feed inlet opening having a coiled configuration, and the diameter and length of at least a portion of the electrolyte discharge line adjacent to the electrolyte discharge outlet opening having a coiled configuration, are determined by the equation $$R=3.14*(D/2)^2*X*S$$

(Volts)—the total voltage in the array of stacks connected in series,
I (Amp)—the operating current of each stack,
L (%)—approved percentage of shunt current losses in the system,
IL (Amp)—current losses by shunt=I*L,
R (Ohm)—tubing ionic resistance=V/IL,
S (Ohm/cm$^3$)—solution resistance,
D (cm)—tubing diameter, and
X (cm)—tubing length.

16. A method for storing and generating energy, said method comprising:
(i) providing an energy storage and generation system comprising:
at least one vessel suitable for holding an electrolyte;
at least one vessel suitable for holding a gas;
one or more stacks of regenerative fuel cells, said regenerative fuel cells comprising a housing; a proton conducting membrane having a first surface and a second surface, disposed in said housing to partition it into an anode side and a cathode side; an anode disposed on said first surface so as to connect said first surface to the anode side; a cathode disposed on said second surface so as to connect said second surface to the cathode side; said anode comprising a support and a catalyst dispersed thereon; said cathode comprising a carbon powder or a support and a catalyst dispersed thereon; wherein the catalyst dispersed on said anode support and the catalyst dispersed on said cathode support are the same or different and are capable of catalyzing, in the presence of an electrolyte or mixture of electrolytes, a charging reaction and a discharging reaction in said regenerative fuel cells;
wherein said at least one vessel suitable for holding an electrolyte is in fluid communication with said one or more stacks of regenerative fuel cells, and said one or more stacks of regenerative fuel cells are in fluid communication with said at least one vessel suitable for holding an electrolyte, to form at least an electrolyte circulation loop;
wherein said at least one vessel suitable for holding a gas is in fluid communication with said one or more stacks of regenerative fuel cells, and said one or more stacks of regenerative fuel cells are in fluid communication with said at least one vessel suitable for holding a gas, to form at least a gas circulation loop;
wherein said proton conducting membrane has pores with a diameter size which are smaller than 30 nm and comprises: (i) 5% to 60% by volume of an electrically nonconductive inorganic powder having acid absorption capacity, wherein the powder comprising essentially sub-micron particles; (ii) 5% to 50% by volume of a polymeric binder that is chemically compatible with acid, oxygen and fuel; and (iii) 10 to 90% by volume of an acid or aqueous acid solution;

(ii) storing energy by flowing electrolyte from said at least one vessel suitable for holding an electrolyte to said one or more stacks of regenerative fuel cells, oxidizing the electrolyte and producing hydrogen in the one or more stacks of regenerative fuel cells, and flowing the hydrogen to the at least one vessel suitable for holding a gas; and (iii) generating energy by flowing electrolyte from said at least one vessel suitable for holding an electrolyte to said one or more stacks of regenerative fuel cells, flowing hydrogen from said at least one vessel suitable for holding a gas to said one or more stacks of regenerative fuel cells, reducing the electrolyte and oxidizing the hydrogen in the one or more stacks of regenerative fuel cells;

wherein the one or more stacks of regenerative fuel cells further comprise (i) an electrolyte feed inlet opening and an electrolyte feed line extending from the electrolyte feed inlet opening exteriorly from the one or more stacks of regenerative fuel cells, said electrolyte feed line in fluid communication with said at least one vessel suitable for holding an electrolyte, for delivery of electrolyte into the one or more stacks of regenerative fuel cells; and (ii) an electrolyte discharge outlet opening and an electrolyte discharge line extending from the electrolyte discharge outlet opening exteriorly from the one or more stacks of regenerative fuel cells, said electrolyte discharge line in fluid communication with said at least one vessel suitable for holding an electrolyte, for removal of electrolyte from the one or more stacks of regenerative fuel cells;

wherein at least a portion of the electrolyte feed line adjacent to the electrolyte feed inlet opening has a coiled configuration, and at least a portion of the electrolyte discharge line adjacent to the electrolyte discharge outlet opening has a coiled configuration; and wherein the diameter and length of at least a portion of the electrolyte feed line adjacent to the electrolyte feed inlet opening having a coiled configuration, and the diameter and length of at least a portion of the electrolyte discharge line adjacent to the electrolyte discharge outlet opening having a coiled configuration, are determined by the equation $$R=3.14*(D/2)^2*X*S$$

(Volts)—the total voltage in the array of stacks connected in series,

I (Amp)—the operating current of each stack,

L (%)—approved percentage of shunt current losses in the system,

IL (Amp)—current losses by shunt=$I*L$,

R (Ohm)—tubing ionic resistance=$V/IL$,

S (Ohm/cm$^3$)—solution resistance,

D (cm)—tubing diameter, and

X (cm)—tubing length.

17. The method of claim 16 further comprising maintaining a different electrolyte and gas pressure within a fuel cell stack by:

sensing the pressure of electrolyte and gas within the fuel cell stack; and controlling the pressure of electrolyte entering the fuel cell stack sufficient to maintain the electrolyte pressure different from the gas pressure within the fuel cell stack.

18. The method of claim 17 wherein the electrolyte pressure is maintained lower than the gas pressure within the fuel cell stack.

19. The method of claim 17 wherein a pressure differential controller in fluid communication with a pressure reducing valve is used for controlling the pressure of electrolyte entering the fuel cell stack sufficient to maintain the electrolyte pressure different from the gas pressure within the fuel cell stack.

* * * * *